United States Patent
Zhang et al.

(10) Patent No.: US 12,229,804 B2
(45) Date of Patent: Feb. 18, 2025

(54) MULTI-OBJECTIVE ELECTRONIC COMMUNICATION FREQUENCY OPTIMIZATION

(71) Applicant: ADOBE INC., San Jose, CA (US)

(72) Inventors: Lei Zhang, Fremont, CA (US); Lijun Yu, San Jose, CA (US); Jun He, Fremont, CA (US); Zhenyu Yan, Cupertino, CA (US); Wuyang Dai, San Jose, CA (US)

(73) Assignee: Adobe Inc., San Jose, CA (US)

( * ) Notice: Subject to any disclaimer, the term of this patent is extended or adjusted under 35 U.S.C. 154(b) by 24 days.

(21) Appl. No.: 17/366,910

(22) Filed: Jul. 2, 2021

(65) Prior Publication Data

US 2023/0005023 A1    Jan. 5, 2023

(51) Int. Cl.
*G06Q 30/02*     (2023.01)
*G06Q 30/0272*   (2023.01)

(52) U.S. Cl.
CPC ................. *G06Q 30/0272* (2013.01)

(58) Field of Classification Search
CPC .................................................. G06Q 30/0272
See application file for complete search history.

(56) References Cited

U.S. PATENT DOCUMENTS

| | | | | |
|---|---|---|---|---|
| 7,475,116 B2 * | 1/2009 | Hay | ......................... | H04L 51/00 709/206 |
| 10,778,628 B2 * | 9/2020 | Brechbuhl | ............ | G06F 16/248 |
| 2010/0017194 A1 * | 1/2010 | Hammer | ................. | G06F 40/30 704/9 |
| 2018/0097759 A1 * | 4/2018 | Brechbuhl | ........ | G06F 16/24578 |
| 2020/0027124 A1 | 1/2020 | Knodel et al. | | |

OTHER PUBLICATIONS

University of Chicago, "Too Many Metrics" (Year: 2016).*

* cited by examiner

*Primary Examiner* — Breffni Baggot
(74) *Attorney, Agent, or Firm* — Shook, Hardy & Bacon L.L.P.

(57) ABSTRACT

Methods and systems are provided for improved electronic communication campaign technologies, which can automatically balance objectives or goals of an electronic communication campaign against an overall opt-out rate for the electronic communication campaign. An electronic communications frequency optimizer can generate individual contact frequencies for individual email recipients. Embodiments can avoid unnecessary or counterproductive communications while achieving overall campaign goals, and can use processes to improve the efficiency of systems. In some cases, embodiments cluster communication recipients into different groups based on their past actions, then optimizes the communication contact frequency on different groups, to avoid performing optimization directly on millions of recipients. Some embodiments automatically self-update, for example with recipients' recent responses, to generate and/or implement campaign communication schedules on an individual level.

13 Claims, 10 Drawing Sheets

MULTI-OBJECTIVE ELECTRONIC COMMUNICATION FREQUENCY OPTIMIZATION

BACKGROUND

Online marketing, using electronic communications, has become one of the most effective ways to acquire and/or retain customers. In some cases, however, an entity could send too many electronic communications to customers and abuse the use of customers' contact information or permission to send communications. For example, sending too many electronic communications within a certain period of time can reduce the customers' experience and cause one or more customers to opt-out of an online marketing campaign. Research indicates excessive frequency of electronic communications is the number one reason customers opt-out of campaigns. It is difficult, however, for marketers to determine an optimal contact frequency for recipients in a marketing campaign that will achieve goals of the campaign while avoiding excess opt-outs.

SUMMARY

In online marketing campaigns, such as electronic communications campaigns, marketers want to increase brand awareness or convert customers while maintaining opt-outs at an acceptable level for the campaign, for example. Accordingly, embodiments described herein are directed to performing multi-objective electronic communications frequency optimizations. At a high level, an entity or individual, such as a marketer, can set objectives or goals for an electronic communications campaign. For instance, a company can track a list of customers or potential customers who have agreed to receive electronic communications from the company (e.g., when purchasing a product by selecting an option to receive informative or promotional emails from the company). The company can develop an electronic communications campaign with an offer or advertisement to be distributed to the customers in an email or a series of emails over a time period, or in text messages or other electronic communications. The emails can feature a new product or sale price, for example. A marketer working for the company can select certain goals for the electronic communications campaign, such as at least a 10% open rate, or at least a 10% click rate on link(s) within the electronic communications. In embodiments, a marketer can also select a desired or tolerated range of opt-out percentages, such as an opt-out rate below 20%, for the electronic communications campaign. According to aspects of embodiments described herein, marketers can achieve their campaign goals without causing too high of a rate of opt-outs, so that the company does not lose permission to contact too many of its customers, for example for future electronic communications campaigns. In embodiments, frequency optimization is based on maximizing campaign goals, such as opened electronic communications, and limited by an opt-out count according to an opt-out probability. A two-step model for opt-out probability can be used as part of the frequency optimization. The output or result of frequency optimization can be a frequency capping value (for example, x). This frequency capping value, x, can be for a certain period of time, such as thirty days. In embodiments, a frequency optimization is performed at a group level and on an individual basis, based on overall campaign goals and an overall tolerated opt-out range.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Overview

Figure 1:
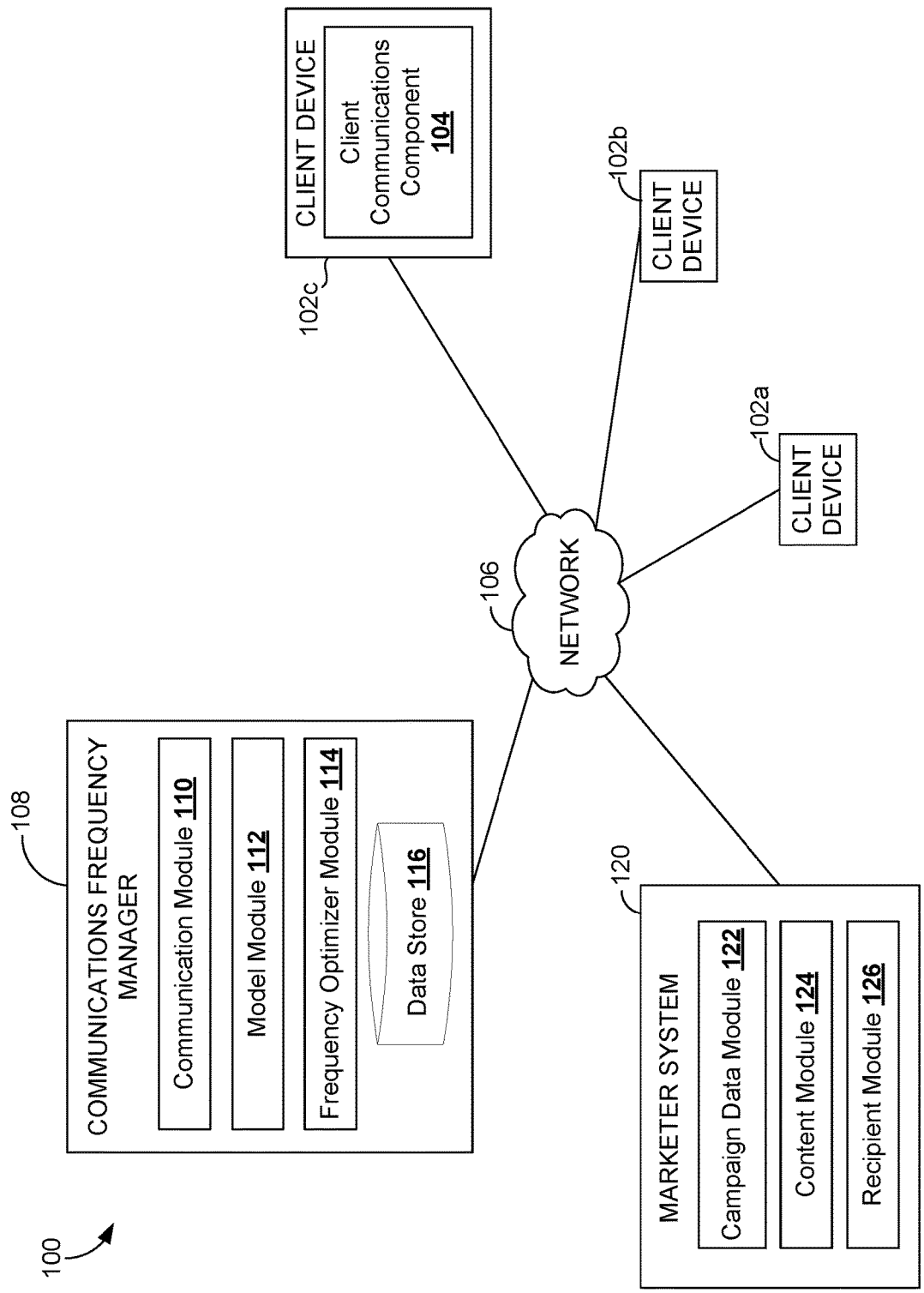
FIG. 1 depicts an example operating environment suitable for use in implementations of the present disclosure.

Electronic marketing campaigns are important to entities for purposes of communicating with customers, including potential customers. Electronic marketing communications can be sent to recipients who agreed to receive electronic communications from a company. Recipients, however, tend to opt-out if the frequency of electronic communications is too high. As such, it is important for entities to meet campaign goals without causing excessive opt-outs, such as people selecting to cancel or unsubscribe from communications. As electronic communications campaigns have different objectives and different customers, it is difficult for a campaign manager to generate a delivery strategy for electronic communications to achieve goals of the campaign including an acceptable opt-out rate. Research indicates nearly one-half of opt-outs from electronic communications campaigns are based on excessive frequency of messages to recipients.

Conventional technologies can include fixed batch deliveries for electronic communications campaigns, with messages sent on a fixed day, at a fixed time, and/or with fixed content (such as the same content for all potential customers). These conventional technologies are not adaptable or flexible for various customers. As one example, certain customers may tend to open email messages in the morning, e.g., approximately 7:00 AM, while other customers may open email messages more often in the evening. Some customers may be less likely to open a campaign email if it was received, for example, over ten hours ago, perhaps because additional emails have accumulated. This individual behavior cannot be considered using fixed technologies. Additionally, some customers may have different interest levels in a certain product, for example due to demographics such as an age group or due to recent purchases. Thus, conventional technologies with fixed content and deliveries can be ineffective with respect to individual customers.

Conventional technologies with fixed content and deliveries can also be ineffective in the context of individuals with varying levels of tolerance for receiving campaign email messages. Although some conventional batch technologies may select to deliver emails on holidays or other occasions, or to avoid certain days or occasions, the days and times are often random and are implemented for all email recipients, with the same content for all recipients. But individual customers may have different levels of tolerance for email messages (e.g., how many messages they are willing to receive prior to an opt-out). This tolerance level may depend on the type of email message (e.g., brand awareness versus a conversion email), or the newness of a customer to an electronic communication campaign or to a brand experience. In some cases, the tolerance level may depend on the users' interactions with email or other messages. For example, a customer may tolerate five promotional emails a week if they are not opened, but only two a week if they are being opened. Conventional technologies such as batch deliveries do not account for these differences.

Some conventional technologies may try to apply empirical or rule-based approaches, to address the short-comings described above, but these conventional technologies can require time-consuming, human input. For example, these conventional technologies can require using groups for split, or A/B, testing, and they require observations and results summarized into rules by human beings. For example, a rule could indicate that if a customer has a higher open-email rate, then a marketer may send more emails to the customer. These conventional technologies can require a significant amount of human input, without being able to automatically optimize electronic communication frequency, and these technologies can require considerable time and resources, including failed or less-effective test groups. Rule-based technologies can include conflicting rules and/or ambiguous rules that cannot be automatically applied, for example requiring marketers to still determine precise values for delivery frequency, delivery time, etc. They cannot optimize the frequency of email messages without requiring manual determinations based on conflicting or ambiguous rules.

Other conventional technologies may try to address issues relating to various individual recipients, such as frequency optimizing at an individual level, but these conventional technologies may also require substantial human input. For example, these technologies may only seek to avoid individual customer opt-outs, at the individual level, not a campaign level. A human marketer may still be required for frequency optimizing at an individual level, because a campaign's objectives are not addressed nor automatically balanced with one or more opt-outs or an opt-out rate. These conventional technologies with only individual-level frequency considerations are not configured to increase brand awareness or convert customers while maintaining opt-outs at an acceptable level for a campaign. Additionally, conventional technologies operating at the individual level, with no frequency calculations performed on groups or clusters, do not account for or consider overall electronic communication campaign goals including opt-out rates.

Accordingly, embodiments described herein provide solutions that improve electronic communications campaign technologies, for example by automatically balancing one or more objectives of an electronic communications campaign against an overall opt-out rate for the campaign. In some cases, data from one or more models (for example relating to an open probability for electronic communications, or to an opt-out probability) is used by a frequency optimizer, along with campaign objectives and an opt-out rate tolerance. The frequency optimizer can generate individual contact frequencies for individual email recipients. In embodiments, an estimated campaign-level engagement and/or opt-out rate is also generated. Embodiments described herein can avoid unnecessary or counterproductive communications while achieving overall campaign goals. In implementations, a process can be used to construct an opt-out probability, including preprocessing, which can improve the computational efficiency of systems implementing embodiments described herein. In operation, generally, aspects of the present disclosure cluster electronic communications recipients into different groups based on their past responses and activities. Thereafter, a contact frequency for electronic communications is optimized for each of the different groups, thereby avoiding time and other resources of an optimizer directly working on each of millions of recipients without any grouping of clustering of recipients for efficiency or reduced resources. Additionally, embodiments automatically self-update with the latest recipients' responses to improve electronic communications schedules based on the updates, and embodiments can automatically generate or implement new schedules.

Operating Environment

Turning to FIG. 1, a general operating environment 100 is shown, in accordance with one or more embodiments for generating or managing an electronic communications campaign. As shown in the exemplary operating environment 100 in FIG. 1, one or more client devices, such as client devices 102$a$, 102$b$, and 102$c$ (including one or more client communications components 104), can communicate with one or more other devices using a network 106. For example, a communications-frequency manager 108 can communicate with the client devices 102$a$, 102$b$, and 102$c$ using the network 106. The communications frequency manager 108 can embody or implement a multi-objective communications frequency management system. A client device 102$c$ can have a client communications component 104, which may send or receive emails, for example. A client device 102$a$, 102$b$, 102$c$ can also include or capture client device user data, which can be information relating to a user of the client device. Such information can include demographic information, communication opening and clicking data (for example from prior emails or other messages), time of day data, and opt-out information. This information may be useable in creating an electronic communication campaign, for instance, or this information can be collected and stored, for example at data store 116.

In embodiments, an electronic communications campaign is a set of communications to be sent to a set of individual recipients. Although generally described herein as email communications, any type of electronic communications could be used, such as text messages or messages through applications. An electronic communications campaign can relate to a product or service offered by a company or it can relate to increasing brand awareness among customers. An electronic communications campaign can be a set of emails to be sent to recipients.

Communications from an electronic communication campaign can be received at client devices, such as client device 102*c*. A client device such as client device 102*c* can include or collect client device user data. The client device user data can include information about content and/or services associated with the client device 102*c*. The information can include email response information (such as emails received, emails opened, or emails clicked on). A client communications component 104, for example, can be used to receive or respond to emails. The client communications component 104 can also track documents, videos, digital images, webpages, social networking functionality and content, and the like, including data that the client device 102*c* accesses, selects, or otherwise interacts with, for example by clicking on links.

The communications-frequency manager 108 may include a processing system having one or more processors and devices (e.g., CPUs, GPUs, microcontrollers, hardware elements, fixed logic devices, etc.), and one or more computer-readable media. The various modules 110, 112, and 114, along with the data store 116, are included on the communications-frequency manager 108 in embodiments, and may reside on the computer-readable media to be executed by the processing system. As shown, a communication module 110, a model module 112, a frequency optimizer module 114, and/or the data store 116 can be included on communications-frequency manager 108, or communications-frequency manager 108 may access one or more models on another device or in a distributed fashion. In one example, communications-frequency manager 108 is distributed across more than computing devices such as servers.

A communications-frequency manager 108, in embodiments, analyzes data from client devices (e.g., client device 102*a*) and a marketer system 120 to optimize electronic communication campaigns. For example, communications-frequency manager 108 analyzes behavior associated with a client communications component 104 (such as emails opened or not), and it analyzes data from marketer system 120, in order to implement electronic communication campaign goals and to achieve customer opt-outs within a tolerated range. In embodiments, a marketer or other entity can use aspects of the communications-frequency manager 108, either directly or remotely, to implement an electronic communication campaign. For example, a marketer system 120 can comprise an electronic communication campaign program or interface, available to a marketer for inputting certain data or granting access to data, such as email campaign data and goals and in communication with communications-frequency manager 108. The marketer can use the communications-frequency manager 108 to implement or improve the electronic communications campaign data, for example to receive an output of electronic communications frequencies that are optimized for the campaign.

A processing system of the communications-frequency manager 108 may execute computer-program instructions based on determinations or probabilities received from the modules 110, 112, 114 and other applications of the computing device (not shown) to provide a range of functionality to the communications-frequency manager 108, and a variety of data and program files related to electronic communication campaigns or marketing can also be included (e.g., accessible at data store 116), examples of which include emails, multimedia files, data files, web pages, user profile and/or preference data, and so forth. The communications-frequency manager 108 is shown as having a communication module 110, which is configured to communicate with and obtain resources from a marketer system 120 via a network 106, for example. The marketer system 120 enables the communications-frequency manager 108 to access and interact with various resources made available by the marketer system 120. One example of a marketer system 120 is a marketing data management system such as the Adobe Experience Cloud™. The marketer system 120 may provide users with a platform to gather marketing data, gain insight on industry customers, build personalized advertising campaigns, and manage content and assets for such campaigns, for example.

The marketer system 120, in embodiments, includes modules such a campaign data module 122, a content module 124, and/or a recipient module 126. Campaign data module 122 can include marketing data such as analytics, campaign performance data and/or goals of the campaign, such as an overall rate of opened emails or an overall rate of links clicked within the electronic communications. Campaign data module 122 can also include budgets, online or social media tracking data, and/or content alternatives or preferences that can be used in real-time personalization of advertisements, for example. Content module 124 can include various combinations of text, video, ads, audio, multi-media streams, applications, animations, digital images, webpages, and the like. Content module 124 may also comprise data in the form of datasets that the communications-frequency manager 108 may access, and/or data that the communications-frequency manager 108 may access via the network 106. Recipient module 126 can include data relating to individual recipients of an electronic communication campaign and/or the email addresses of the campaign's recipients, whether the recipients subscribe to an online service including to receive more information or offers, or to a social networking application used by the campaign, as a couple examples.

Returning to the communications-frequency manager 108, the communication module 110 of the communications-frequency manager 108 may also be configured to communicate with and obtain resources from client devices, such as the client devices 102*a*, 102*b*, 102*c*, via the network 106. The communications-frequency manager 108 may make use of the communication module 110 to communicate with the one or more the client devices 102*a*, 102*b*, 102*c*, and/or with a marketer system 120, via the network 106, which can include communications through one or more of a cellular network, a PC serial port, a USB port, and wireless connections such as Bluetooth or Wi-Fi, as examples. For example, a communications-frequency manager 108 can pull or collect data from one or more client devices about an email marketing campaign (such as receipt or performance) and/or the recipients of an electronic communication marketing campaign, such as users of client devices (e.g., a user of client device 102*c*) with respect to preparing and/or executing an electronic communication marketing campaign, as described herein.

The communications-frequency manager 108 may include a data store 116, as illustrated in the exemplary operating environment 100 in FIG. 1. Data store 116 can be configured to store one or more datasets, such as electronic communication campaign datasets, for example relating to potential or ongoing online marketing campaigns. For instance, dataset elements can correspond to individual recipients of an electronic communication campaign, features of each recipient, and/or aspects of electronic communication campaigns associated with the recipients. In embodiments, recipients are each users of client devices, such as client devices 102*a*, 102*b*, 102*c*. An electronic communication campaign dataset, for example, could include information from a marketer system 120 and/or from one or more client devices 102*a*, 102*b*, 102*c*.

As explained with respect to various embodiments below, a communications-frequency manager 108 can analyze data from one or more client devices, such as behavior associated with a client communications component 104, and from one more marketer systems such as marketer system 120, for example in order to implement an electronic communication campaign in accordance with embodiments herein. For example, information from a client communications component 104 can be received by a communications-frequency manager 108, including information regarding emails that a customer has opened, when a user has selected a link (clicked) or otherwise interacted with an electronic communication, and/or when a user of a client device 102*a* has opted-out from an electronic communication campaign, for example by requesting to unsubscribe from one or more electronic communications from an entity. In some cases, aspects of a marketer system 120 can be included as part of a communications-frequency manager 108 included on or distributed among one or more other devices.

In embodiments of an electronic communication-frequency management system, one or more computing devices (such as communications-frequency manager 108, discussed below) automatically generates contact frequency for each individual customer in a campaign, based on the individual customer's historical responses, product affinity, the goal of the campaign, and/or an opt-out rate tolerant level. As discussed in more detail below, embodiments can generate a monthly electronic communications frequency for customers based on historical behavior, and in some cases can automatically perform an electronic communication campaign based on information from a marketer system. In some cases, an optimal sending frequency for a campaign is provided for use in a campaign or automatically implemented as part of a campaign, in order to balance a desired increase in customer engagement and other benefits of an electronic communication campaign, without losing an unacceptable amount of customers through an opt-out process.

As shown in FIG. 1, communications-frequency manager 108 can include a model module 112. Model module 112 can include one or more machine-learning models to predict individual recipient-level engagement and opt-out probabilities, for example. In embodiments, the one or more models associated with model module 112 can include the models shown in FIG. 2, such as a communications open probability model 214, and an opt-out probability model 222. Depending on the campaign goals and the historical customer information available, embodiments can use various models. For example, an email-click probability model 218 can be used where a campaign goal relates to an overall click rate or click amount desired, for example the overall rate or number of recipients who selected a link within a campaign electronic communication, as discussed below.

Figure 2:
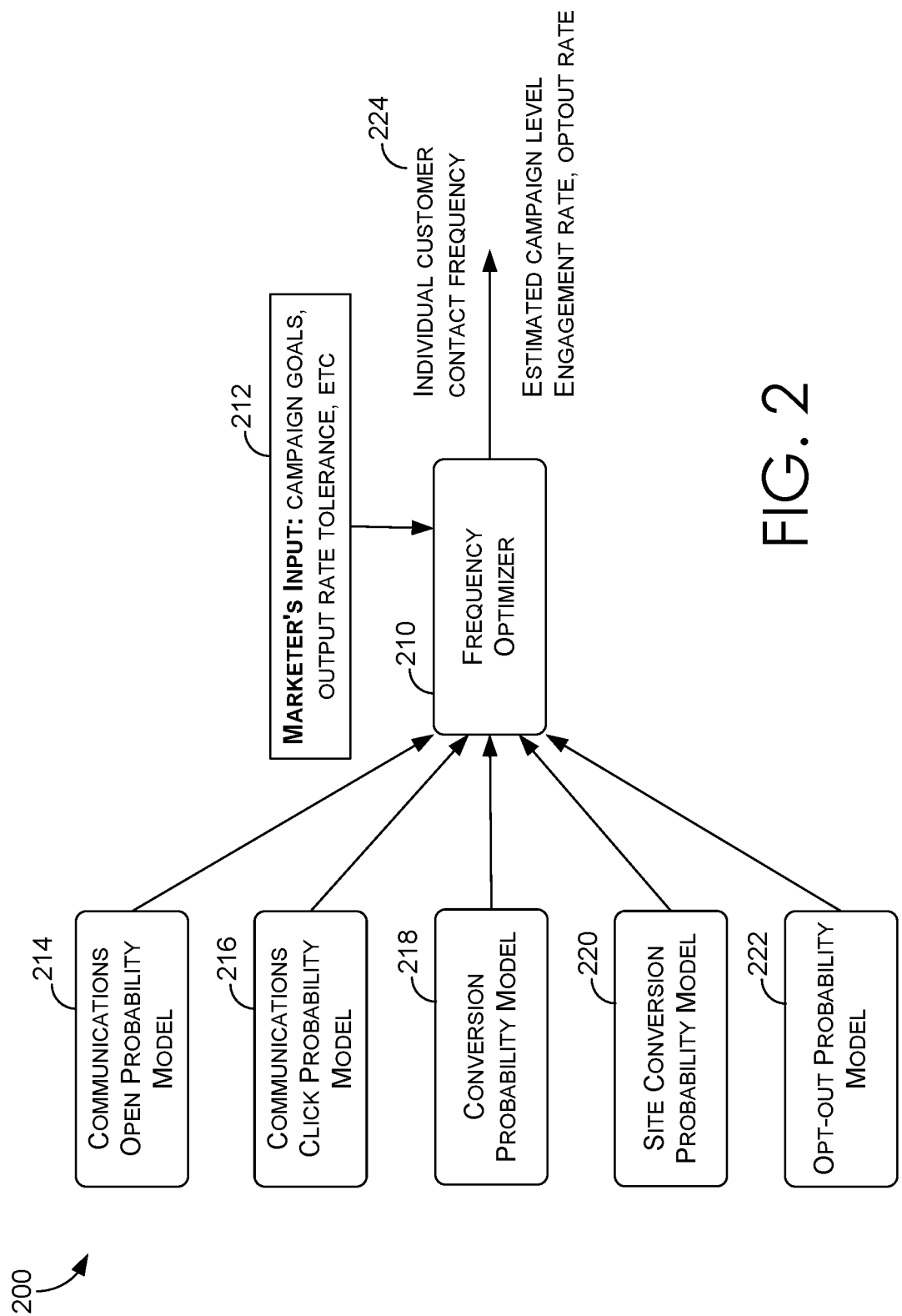
FIG. 2 depicts an exemplary diagram depicting aspects of embodiments suitable for use in implementations of the present disclosure.

Continuing with FIG. 1, a frequency optimizer module 114 is included as part of communications-frequency manager 108. A frequency optimizer module 114 can perform optimizations to provide outputs such as email-frequencies for individual recipients. In one example, frequency optimizer module 114 can comprise or include a frequency optimizer 210, as shown in FIG. 2. A frequency optimizer module 114, or the other modules of the communications-frequency manager 108, can access information from data store 116, such as data received from a marketer system 120 or client device 102*a* over network 106.

The exemplary operating environment 100 in FIG. 1 is one illustration of a system capable of implementing embodiments described herein, to optimize the frequency of emails sent to customers as part of an electronic communication campaign (such as emails received by client devices 102*a*, 102*b*, 102*c*), for example. Such implementations enable marketers to meet overall electronic communication campaign goals while managing customer opt-outs, such as selections to "unsubscribe" and no longer receive emails from a campaign or future campaigns.

When a marketer or other entity decides to implement an online electronic communication campaign, such as an email marketing campaign, the marketer can include goals for the campaign. For example, one goal can be maximizing a "communication open" rate, which indicates the number of campaign communications opened by recipients. Another goal can be the number of links within the communication that are used or selected by users. These exemplary goals can be used in combination or as alternatives. For example, a marketer can focus on a "communications open" rate and desire to balance a campaign-wide "email open" rate against an acceptable campaign-wide opt-out rate.

In some cases, goals include brand awareness, which may include communications with little or no pressure to act by the users. Goals can include conversion of customers, such as new or current customers making a purchase or taking another action. In some cases, goals can include keeping customers informed or reminded of products or services, and, for example, maintaining a low opt-out rate. Or, in other cases, goals can include causing the most purchases or clicks per campaign while tolerating a relatively higher opt-out rate. For example, a marketer using marketer system 120, or another entity, can input one or more goals for an electronic communication campaign into a campaign data module 122, so that the email-frequency manager 110 can access campaign goal information. A company may desire to implement goals to keep customer informed most of the time or during periods without product releases or pushes for higher sales. In some cases, during a product release or a period where the company wants increased sales or revenue, the main goals of an electronic communication campaign may change, for example the company may be willing to tolerate a higher opt-out rate during these periods in exchange for higher rates of emails opened or links selected.

In embodiments, one or more campaign goals are provided to marketers via an interface at a client device, such as client device 102*b*. A marketer can select one or more goals using the interface, or customize the rates or values associated with one or more goals, using the client device 102*b*. Client device 102*b* can transmit the campaign goal selections from a marketer to a marketer system 120 over network 106. In some cases, email-frequency manager 110 retrieves campaign goal information from marketer system 120 and stores the most-recent or accurate campaign goal information in data store 116 for later use.

A marketer can set certain campaign goals, including an acceptable overall opt-out rate for an electronic communication campaign. Aspects of embodiments described herein can use historical data regarding potential customers or other users to determine how an electronic communication campaign is likely to be received and acted upon by recipients of the electronic communications. For example, various potential customers, such as users of client devices 102*a*, 102*b*, 102*c*, can have a different affinity for a certain product or brand. As one example, newer customers who just signed up for electronic communications or recently bought a product or related product may respond negatively to too many electronic communications too soon, because the communications may feel abrupt or overwhelming instead of affirming or informative. On the other hand, a newer customer (or any customer) may be identified by a system as actively interacting with campaign communications, such as by opening emails and/or by selecting links or other options within communications. Certain customers can be identified as frequently using a product, such as a streaming service or a delivery service, which can be considered as part of generating an electronic communication campaign for one or more customers.

In embodiments, individual recipients of 0 such as users of client devices 102*a*, 102*b*, 102*c*, can be determined to respond differently to higher-frequency electronic communication campaigns, with respect to their relationship with an entity and/or their affinity for email communications (i.e., high engagement). For example, a potential customer may remain engaged, by continuing to open electronic communications and/or click on links within electronic communications, even if the campaign communications are received every day, for example. Other potential customers may be moderately engaged when communications are received once a week, but be less engaged and demonstrate a lower rate of opened emails above a threshold frequency, such as every other day. In embodiments, the likely actions of individual recipients can be considered as part of an overall campaign with an overall opt-out limit as one of its goals.

Embodiments described herein can provide a system for meeting campaign goals, such as maximizing a total email "open" count, meaning a total amount of emails from an email marketing campaign that were opened by users of one or more client devices 102*a*, 102*b*, 102*c*, or maximizing a total click count or a total conversion rate (e.g., associated purchases), etc. In some cases, the maximized rates may relate to one or more users (for example what amount of users of client devices 102*a*, 102*b*, 102*c* opened an email or clicked a link within an email). In other cases, one or more rates to be maximized is on a campaign level, such as a campaign-level open rate, meaning how many communications were opened of multiple communications sent as part of a campaign (even if multiple communications were opened by the same user, in some cases), or a campaign-level click rate, etc. A goal of a campaign opt-out rate can be a range, such as an opt-out level below 20%, or between 10-20%, for example. In embodiments, the frequency of communications sent to users is optimized so that an electronic communication campaign can achieve campaign goals while maintaining a desired opt-out level.

Communications Frequency Optimization System

FIG. 2 illustrates an exemplary system 200 depicting aspects of embodiments suitable for use in implementations of the present disclosure, for example, an email-frequency optimization system architecture. The exemplary system 200 in FIG. 2 illustrates an embodiment of a multi-objective electronic communications frequency management system, such as communications-frequency manager 108. As shown in FIG. 2, a frequency optimizer 210 receives input, such as marketer input 212. In embodiments, marketer input 212 includes one or more campaign goals or objectives, such an "Communications total open count maximization" (Objective 1); and "Communications total click count maximization" (Objective 2, in this example). Additionally, marketer input can include "Communications total conversion maximization" (Objective 3); "Weighted Open Count, Click Count and Conversion maximization" (Objective 4); "Communications open rate maximization (for awareness)" (Objective 5); and/or "Communications click rate maximization (for site conversion)" (Objective 6). Some or all of these objectives, or other goals, can be input from a marketer system (e.g. marketer system 120 in FIG. 1) or provided from one or more marketer sources or data storage, and additional goals, or differently-named versions of these goals, can be used in embodiments.

A marketer can provide other various inputs for use by the system 200. For example, a marketer can provide, as marketer input 212, parameters for opt-out rates by users. As one example, marketer input 212 can include an opt-out rate tolerance for an electronic communication campaign. The opt-out rate tolerance can indicate an amount or percent of customers or potential customers the marketer is willing to accept as likely or expected to opt-out of receiving email notifications from an entity as part of an electronic communication campaign. For example, a marketer may select to only tolerate an opt-out rate below a percentage, such as 5% or 10%, which the system can consider along with the objectives of the electronic communication campaign. In some cases, an opt-out rate tolerance ratio, can be used to determine the expected opt-out rate for the campaign, by multiplying the opt-out tolerance ratio against a current opt-out rate to determine an expected opt-out rate for a campaign, for example. In other words, an expected opt-out rate can equal a current opt-out rate times the opt-out rate tolerance ratio.

Various machine-learning models can be used to predict aspects of an electronic communication campaign, which can be used by a frequency optimizer 210. In the example in FIG. 2, models include machine-learning models used to predict recipient-level engagement and opt-out probabilities. The models in this example include a communications open probability model 214, a communications click probability model 216, a conversion probability model 218, a site conversion probability model 220, and an opt-out probability model 222. In certain cases, one or more models can be used, including data from machine-learning models or dynamically-updated models. One or more models use customers' historical email engagement activities, website engagement activities, and/or product purchase or usage activities, for example, to predict various probabilities.

A communication open probability model 214 can be used to predict the likelihood a communication, for example an email as part of an electronic communication campaign, will be opened by the recipient, in embodiments. The communication open probability model 214 can receive inputs regarding user behavior, such as prior actions in response to prior communication by users. In some cases, the communication open probability model 214 can receive input regarding prior actions by users to different types of emails, or to emails received at certain times of day, or to emails received above a certain frequency level, for example. The communication open probability model 214 can be used when one of the marketer's objectives relates to the total amount or percentage of campaign emails that will be opened by email recipients.

A communications click probability model 216 can be used to predict the likelihood that a user will make a selection of one or more items within a campaign communication, such as selecting or clicking on a link within a campaign email. For example, a marketer can set as an objective a certain amount or percentage of communications within a campaign that will lead to a recipient clicking on at least one link contained in the campaign communication. A link within a campaign communication can be a hyperlink to a company's website or a link to a webpage with an option to purchase a product, for example. In one example, a campaign email can include a unique offer to one or more users, such as a special sale price on an item or service. The offer can be presented as a link, which users can select, that will enable users to purchase the item or service at a discounted rate. In this example, the link may not be generally available to the public or searchable, and the link may only be provided in campaign emails. In embodiments, a link can be presented in a campaign email as an image or icon that can be selected. The communication click probability model 216 can receive inputs regarding prior user actions in response to emails, and other information about the electronic communication campaign and/or recipients, in embodiments.

A conversion probability model 218 can also be used by the system 200. In embodiments, the conversion probability model 218 provides a prediction of the likelihood that an email in an electronic communication campaign will result in a purchase from a company or other target actions, such as signing up for a service. For example, a conversion can include a purchase by a user based on one or more links provided in a campaign email, which a user can select to reach a check-out page. A conversion could comprise a user joining a group via a link in a campaign email, in embodiments. In some cases, a conversion may not happen directly from a link within a campaign email. Instead, a conversion could be a purchase or other action taken with respect to an entity, such as a seller, within a window after receiving a campaign email. For example, a conversion probability model 218 could consider a conversion to include purchases made from an entity's website within one day of receiving a campaign email to be a conversion.

One or more outputs from the machine-learning models can be input to the frequency optimizer 210, as shown in the example in FIG. 2. A frequency optimizer 210 can be the core of a system for generating or implementing electronic communication campaign technologies, for example to optimize each individual's frequency of email receipts or contacts, while enabling one or more objectives of a campaign and while keeping an opt-out rate under a predetermined opt-out rate tolerance, as described in more detail below. In embodiments, a system 200 can implement a group level frequency optimization aspect 316, discussed below, prior to out-putting optimized electronic communications frequencies for individuals.

In embodiments, a system 200 can provide frequency-optimizer output 224, such as shown in FIG. 2, which can include, for example, an individual customer contact frequency, which can be on a daily basis, a weekly basis, or an amount of contacts per month, or another increment, such as points of time or intervals at which to contact an individual with one or more electronic communications. The frequency-optimizer output 224 can also include an estimated campaign-level engagement rate and/or opt-out rate. A campaign-level engagement rate can indicate a rate of interaction with campaign emails overall, for the entire campaign, such as an overall communications open rate or click rate, for example, for the entire campaign. A campaign-level opt-out rate can be the overall amount or percent of users included in an electronic communication campaign (as communication recipients) that select to unsubscribe or terminate the receipt of campaign emails or any emails from an entity, for example by withdrawing permission for the company to contact the recipient via email. In embodiments, a frequency optimizer 210 outputs, as frequency-optimizer output 224, an optimal objective curve for a range of opt-out rate tolerance, which is discussed in more detail with respect to FIG. 4, below.

Figure 3:
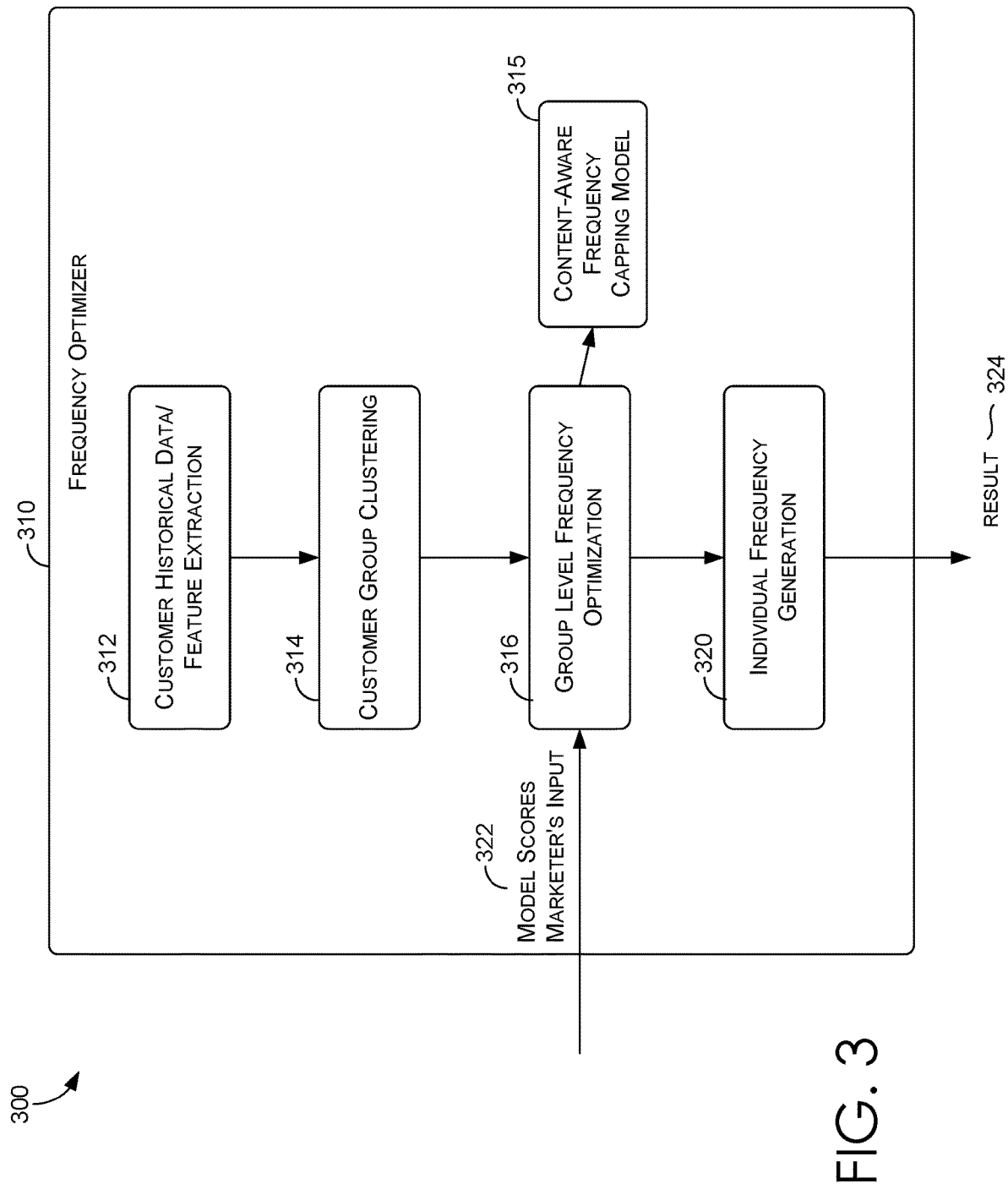
FIG. 3 depicts an exemplary diagram depicting aspects of embodiments suitable for use in implementations of the present disclosure.

Turning to FIG. 3, an exemplary diagram 300 depicting aspects of embodiments is shown, namely a frequency optimizer 310 (which can correspond to frequency optimizer 210 in FIG. 2). Frequency optimizer 310 can implement one or more Equations to automatically make frequency optimization and delivery decisions for each individual (such as users of client devices 102a, 102b, 102c), based on current models, such as open, click, conversion, and/or opt-out models. FIG. 3 illustrates an exemplary framework or workflow of a frequency optimizer 310. A customer historical data/feature extraction aspect 312 is shown as part of frequency optimizer 310. A customer historical data/feature extraction aspect 312 can be a process to extract individual customers' historical responses to emails, such as campaign emails. The historical responses can include responses to receiving emails such as opening or not opening the emails. In one example, the historical responses can indicate if various users are more likely to open emails at certain times of day, such as in the morning or evening, for example. The historical responses can also indicate the amount or ratio of emails opened by each user, in embodiments.

In some cases, historical responses can show activity regarding any selections of links within prior emails, or replies to emails or other actions taken in response. In some embodiments, historical responses show whether users have purchased products or services in response to one or more emails, for example by selecting a link to navigate to a company's webpage and then completing a purchase using the website, or registering for a service using the website. In some cases, historical responses include data regarding users opting out of an electronic communication campaign, for example by selecting to unsubscribe from emails associated with a company.

The historical responses can be associated with demographic data about the users and other information (for example about the emails in the electronic communication campaign, such as content and timing). In some cases, the historical responses represent responses by prior users that can be used to predict future electronic communication campaign outcomes. In some cases, the prior users include some of the current users being targeted by the electronic communication campaign, because system 200 may have access to historical responses from some or all of the current recipients of campaign emails. In other cases, the historical responses represent responses from prior or other users who are not included in a set of current users, but can be used for predicting behavior of the current users, based on demonstrating similar behaviors to certain current users.

The customer historical data/feature extraction aspect 312 can be used by a customer group clustering aspect 314 to divide customers into segments or groups. In embodiments, the division or clustering of customers into groups enables a system 200 to analyze at a group level, which can be more efficient and require less resources than performing the analyses for each individual user. In other words, embodiments of system 200 include aspects that operate at a higher, group level, instead of repeating certain analyses for every user. This can result in significantly reduced required computations. The reduced amount of computation can provide a faster solution and use less computing resources than conventional technologies.

For example, the customer group clustering aspect 314, or segmentation aspect, can reduce computation complexity, so aspects of the frequency optimizer 310 can work on different customer groups instead of individual customers. In some cases, to segment customers into different groups, a clustering algorithm is applied, e.g., K-means clustering based on customers' features, for example. By performing group-level optimization to customer groups (as discussed below, by a group level frequency optimization aspect 316), systems such as system 200 can reduce the resources, such as power and time, needed for the system 200 to determine aspects of an electronic communication campaign, such as a frequency optimization. Frequency optimizer 310 can collect campaign-level and individual-level recipients' responses to a delivery, such as a batch delivery, after a period of time, for example. In embodiments, frequency optimizer 310 can update the models based on the latest response(s) (such as performing model calibration), and generate a new frequency optimization and delivery decision for a future time.

In embodiments, a content-aware frequency capping model 315 is implemented as part of frequency optimization, as discussed in more detail below. As an example, the content-aware frequency capping model 315 can be used to provide limits on the frequency of emails based on the content of the emails, discussed below. In embodiments, the content of the emails can be based on whether the email subject line or the email body is determined to relate to advertisements or not. For example, a frequency cap can be provided by a content-aware frequency capping model based on responses to emails with a non-advertisement-type subject line but an advertisement-type email body. In some cases, users may have lower tolerance levels for emails that do not appear to relate to advertisements before they are opened, but, when they are opened, the body of the email relates to an advertisement. Customers may respond by opting out sooner and/or at a higher level if certain companies are perceived as trying to mislead them. If an entity sends an email with a subject line relating to a recent purchase ("RE: Your Order Number 123"), but the body of the email is an advertisement for another product to be used with the recent purchase, a user may be more likely to opt-out than if the emails in an electronic communication campaign have subject lines that are consistent with the bodies of the emails, with respect to advertisements. The information from the content-aware frequency capping model 315 can be used by the frequency optimizer 310 to perform a group level frequency optimization 316.

As shown in FIG. 3, model outputs such as scores and/or marketer input 322 can be used by a frequency optimizer 310 with respect to a group level frequency optimization aspect 316. In embodiments, the parameters of an electronic communication campaign such as its goals and other data are set by a marketer and applied by a system, such as system 200, at a group level, as shown in the more detailed frequency optimizer 310 in FIG. 3. Embodiments can also apply scores or other outputs from models regarding probabilities (such as email-open or email-click), which are relevant to one or more campaign goals, at the group level. Thus a group level frequency optimization aspect 316 can consider or apply scores from one or more models (e.g., communications open probability model 214 in FIG. 2) and one or more Objectives from marketers, or other information regarding an electronic communication campaign or customers, at a group level, saving computational time and energy.

The group level frequency optimization aspect 316 can be used to apply one or more email-campaign objectives to a group or cluster of customers. The objectives can relate to the overall number of emails opened or the overall number of emails where a link is selected or clicked on by recipients, for example. In embodiments, the email-campaign objectives may include any or all of Objectives 1 through 6, above, for example. As explained above, the group level frequency optimization aspect 316 can perform analyses on customer segments or clusters relating to achieving campaign goals, without having to perform the calculations for each individual customer. One or more of the equations described below can be used by frequency optimizer 310 at the group level, to determine electronic communications frequencies for groups that achieve goals, such as the highest number of opened or clicked-on emails possible.

As one example, $Obj_1$ (Objective 1) above may be applied at the group level. Objective 1 relate to maximizing a total open-email count in a campaign, which can be expressed as:

$$\max_X \sum_{k=1}^{n} (\text{Open}(x_k) * x_k * N_k) \quad \text{(Equation 1)}$$

In Equation 1, above, $x_k$ represents the number of emails sent (email send count) per customer, for example in the $K^{th}$ customer group. The term Open( ) can be the predicted open rate for a customer group, for example from a communications open prediction model. $N_k$ can represent a number of recipients in the $K^{th}$ customer group, while n represents the number of customer groups. An associated constraint can be expressed as:

$$\Sigma_{k=1}^{n}(\text{Fatigue}(x_k)*x_k*N_k) \leq F \quad \text{(Equation 2)}$$

$$x_{min} \leq x_k \leq x_{max} \quad \text{(Equation 3)}$$

In Equation 2, above, Fatigue( ) represents a predicted fatigue rate for a given send-email count $x_k$ from a fatigue model, for example. F can be a maximum total fatigue customer count, for example from a marketer's input or another source. $X_{min}$ can represent a minimum send-email count per customer, which could also be from a marketer's input or from another source, such as a data store or model. The term $x_{max}$ can represent a maximum send-email count per customer, for example based on a marketer's input or other information. Equations 2 and 3 can be used by frequency optimizer 310, along with Equation 1, at the group level, on segments or clusters of customers.

Additional or alternative email-campaign objectives can be applied, such as Objective 2 ($Obj_2$) above, which relates to an overall email-click count, such as the overall amount of communications in an electronic communication campaign where a link in the body of the communication is selected by a recipient. To apply Objective 2, Equation 4, below, can be used along with Equations 2 and 3, for example, to indicate an email-total-click-count maximization:

$$\max_X \sum_{k=1}^{n} (\text{Click}(x_k) * x_k * N_k) \quad \text{(Equation 4)}$$

Equation 4, above, can use a click rate, represented above by "Click($x_k$)", where $x_k$ indicates a total number of emails sent. Equation 4 can be used to determine an email-total-click-count maximization, which a system 200 can use to determine electronic communications frequencies that will result in the most clicks or selections of links within the emails of the electronic communication campaign. Thus, if a marketer has an email-campaign objective to achieve the most or maximum clicks on links within the emails as possible, Equation 4 can be used by the system 200 to determine electronic communications frequencies that will result in the most clicks on links as possible. In embodiments, system 200 maximizes the amount of campaign emails associated with clicks by users that is still within the acceptable opt-out rate.

As another example, in embodiments, a marketer may desire to set, as one of the campaign goals, to maximize the total number of conversions. Conversions can be purchases or sign-ups associated with an electronic communication campaign, for example, such as emails leading to purchases. Objective 3 ($\text{Obj}_3$), above, relates to an email-total-conversion maximization, which can be indicated by the following equation:

$$\max_X \sum_{k=1}^{n} (\text{Conversion}(x_k) * x_k * N_k) \quad \text{(Equation 5)}$$

Equation 5 can be used along with Equations 2 and 3, in embodiments, to optimize the electronic communications frequency for a maximum number of conversions.

Continuing with another example, Objective 4 ($\text{Obj}_4$) above can be represented by the following equation, relating to a weighted open count, click count, and conversion maximization, for example:

$$\max_X \sum_{k=1}^{n} [a_1 \text{Open}(x_k) + a_2 \text{Click}(x_k) + a_3 \text{Conversion}(x_k)] * x_k * N_k$$

In Equation 6, above, for example, Click( ) can indicate a predicted click rate, such as from a click model (e.g., a communication click probability model 216, as shown in FIG. 2). Conversion( ), can be a predicted conversion rate, for instance from a conversion model. Additionally, $a_1$, $a_2$, $a_3$ can be weighted factors. Weighted factors can be used to assign relative weights to the one or more aspects of Objective 4, namely the open count, click count, and/or conversion aspects. In one example, Objective 4 relates to a goal of a combination of an email-open amount or count, an email-click amount, and/or a conversion amount. For example, a marketer may desire to achieve all three aspects of Objective 4 with an electronic communication campaign, therefore the equation considers all three. Instead of maximizing for only an email-open count or only an email-click count, all three can be considered together as part of Objective 4. In embodiments, a marketer is able to weigh each aspect, for example by assigning a 0.25 or 25% weight to two aspects and a 0.5 or 50% weight to a third aspect. In this example, the aspect a conversion count or amount could be given twice as much weight, using a weighted factor, than the aspects of an email-open count and an email-click count. Other combinations and weights are possible, in embodiments, depending on a marketer's selection of aspects of Objective 4 and weights.

Continuing with FIG. 3, an individual frequency generation aspect 320 is illustrated, which can generate an individual contact frequency for each individual customer, including potential customers in some cases, or other members or recipients of a marketing campaign. In embodiments, an individual frequency generation aspect 320 determines or provides individual contact frequencies per recipient, which can be used to set an electronic communications frequency schedule for one or more individual recipients as part of an electronic communication campaign. For example, the individual frequency generation aspect 320 can provide an adjustment or update to a current frequency level for one or more individuals.

As one example, if a current electronic communication campaign has implemented an email frequency of sending one or more customers emails every other day, in the evening, the updated email frequency based on the individual frequency generation aspect 320 can implement an email frequency that is adjusted to every third day, prior to noon. In some cases, the individual frequency generation aspect 320 can generate a new individual contact frequency for one or more individuals for a new electronic communication campaign, by generating a new version of a prior contact frequency for one or more individuals. In another example, if a past electronic communication campaign had used an email frequency of once a month, an updated electronic communication frequency for a new electronic communication campaign could be twice a month. The current or prior electronic communications frequencies can be used as historical contact frequencies. An individual frequency generation aspect 320, in embodiments, can generate a contact frequency based on a group-level ratio between a new frequency to be implemented and a past or recent contact frequency. For example, an equation such as (Equation 6)

Equation 7, below, can be used to calculate a ratio based on prior contact frequencies to customer groups.

$$y = y_{past} * \frac{x^*}{x_{past}} \quad \text{(Equation 7)}$$

In the exemplary Equation 7 above, the term $x^*$ represents an optimized contact frequency for a customer group to which an individual customer belongs, such as the groups used in the group-level frequency optimization aspect 316, described above. The term $x_{past}$ represents a historical contact frequency for the customer group, for example, such as the contact frequency for the prior 30 days, or the prior 60 days or prior 7 days, as examples. The term $y_{past}$ can represent an individual customer's prior 30 days of contact frequency, for example, or another time period such as 60 or 7 days.

As shown in FIG. 3, model scores and/or marketer input 322 can be input(s) into a group level frequency optimization aspect 316, for example scores from one or models (e.g., communications open probability model 214). Also as shown in FIG. 3, a result 324 can be output from a frequency optimizer 310, in embodiments. In some cases, a result 324 can be automatically output and automatically used by embodiments described herein to create and/or implement an electronic communication campaign with an optimized frequency of emails sent. A result 324 can comprise, in embodiments, an email schedule on an individual basis, or instructions to automatically implement an update to an email schedule, in order to optimize the frequency of emails to individuals based on campaign goals without exceeding an opt-out tolerance range.

Incremental Prediction Model for the Opt-Out in the Frequency Optimizer

Figure 5:
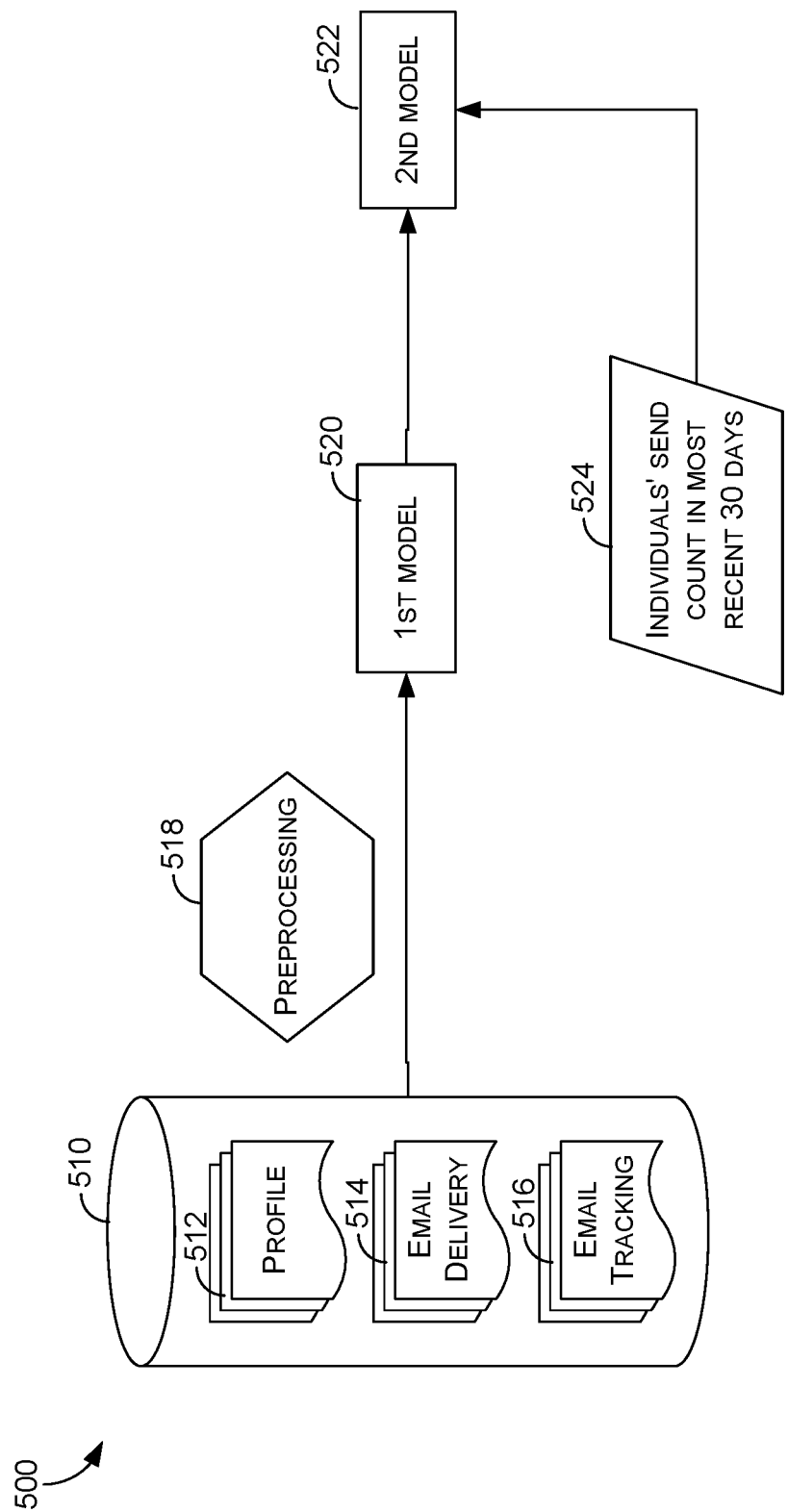
FIG. 5 depicts an exemplary diagram depicting aspects of embodiments suitable for use in implementations of the present disclosure.

As discussed above, a communications-frequency manager 108 can use a system, such as system 200 including a frequency optimizer 210, to determine maximizations for one or more objectives, such as Objectives 1 to 6 above. In embodiments, an incremental prediction model can be used to limit the opt-out count for an electronic communications campaign. An opt-out probability can be constructed, as discussed with respect to FIG. 5. In some cases, an incremental model is used to limit opt-outs, based on an opt-out probability, for example as constructed according to a process illustrated in FIG. 5. The exemplary process in FIG. 5 illustrates a model including steps to construct a probability of opt-out(s) after sending an amount of emails (n emails), which can be used to limit the total opt-out rate or count for a campaign. This process can be implemented by the exemplary opt-out probability model 222 in FIG. 2, and applied by the frequency optimizer 210.

Frequency optimization can limit the level of opt-outs, so that a system 200 can maximize achieving campaign goals will keeping the overall opt-out level for the campaign below a threshold level. For example, a frequency capping for the next thirty days can be implemented according to embodiments to maintain an opt-out amount below a certain level. This can balance the objectives of the electronic communication campaign against an overall opt-out rate for the campaign. As an example, a frequency optimizer (such as frequency optimizer 210 in FIG. 2) can determine a frequency capping x for a certain period of time, such as thirty or sixty days. The frequency optimization can balance or find a compromise between two parts. The first part is maximization of a campaign goal or objective, as discussed herein. The second part is limiting an opt-out count, which can use a summation of opt-out probability functions described below, for example. The probability functions can be modeled by the two-step model illustrated in FIG. 5, for example. These two parts are achieved by frequency optimization algorithms, according to embodiments herein, simultaneously, which can improve the processing of such determinations and optimize the resources expended.

A frequency cap can be applied for other time periods, such as the following week or sixty days. A frequency cap could be triggered automatically, in embodiments, based on the system 200 determining that a threshold level of opt-outs is being approached, or that the opt-outs are occurring at a faster rate than expected. In some cases, a fatigue tolerance ratio F is provided by a system, for example as input or determined by a marketer. An exemplary constraint to indicate this can be, for example:

$$\frac{\sum_{i=1}^{k} p_i(\text{optout} \mid \text{freq cap } x_i) N_i}{\sum_{i=1}^{k} N_i} \leq F \quad \text{(Equation 8)}$$

In Equation 8, above, $N_1$ can represent a number of recipients in an i-th subgroup (or $i^{th}$ subgroup). Recipients can be, for example, users of client devices 102a, 102b, 102c, etc., up to any amount of client devices. The term $p_i$ (optout|freq cap $x_i$) can be a probability of individuals in subgroup i to opt-out after the sending of $x_i$ emails, such as in 30 days, as one example. In embodiments, a number of emails or the number of emails in a time frame can be used, with 60 days or other time periods in some cases. The constraint illustrated by Equation 8 can be replaced with other, customized or tailored constraints with respect to opt-outs. The probability shown in Equation 8 can be expanded as shown in the following example, in embodiments, to consider the probabilities of opt-outs based on multiple emails sent:

$p_i$(optout|freq cap $x_i$)=$p_i$(optout|send 1 email)+(1−$p_i$ (optout|send 1 email))*$p_i$(optout|send 2nd email))+(1−$p_i$(optout|send 1 email))*(1−$p_i$(optout|send 2nd email))*$p_i$(optout|send 3rd email))+ . . . +$p_i$(optout|send $x_i$-th email)) $\Pi_{m=1}^{x_i-1}$(1−$p_i$(optout|send m−th email))   (Equation 9)

The expanded equation shown in Equation 9, above, can be approximated as shown below, in Equation 10. In general, an opt-out rate can be small, in some cases smaller than $1 \times 10^{-3}$ or 1e-3, so an equation such as Equation 9, discussed above, can be approximated by the following summation, in embodiments:

$\sum_{m=1}^{x_i} p$(optout|send m−th email)   (Equation 10)

In embodiments, approaches can include constructing the following term: $p_i$(optout|send m−th email), for example using historical email response actions. In embodiments, aspects such as Equations herein have properties, such as being convex and/or non-decreasing and/or smooth as a function, as discussed in more detail below. For example, it is proposed that frequency optimization, in accordance with embodiments herein, is a convex optimization problem. Convex optimizations can comprise minimizing convex functions over convex sets, for example, and may involve admitted polynomial-time algorithms.

As one example, a convex optimization can be generally defined as:

$$\min f_0(x) \quad \text{(Equation 11)}$$

$$s.t. \ f_i(x) \leq b_i, i=1,2,\ldots,m$$

where $$f_0, f_1, \ldots, f_m: R^n \to R$$

are convex functions.

In some cases, convex optimization problems (as opposed to non-convex) have advantages, such as the existence of a guaranteed, global optimal solution and relatively low computational resource requirements, because a local search algorithm is able to converge to a global optimal solution, in embodiments. Use of convex optimization(s) as described herein, with a global optimal solution, can improve the resources and/or computation requirements and improve the operation of a computing system. In contrast, nonconvex optimizations can be considered at least NP-hard (or non-deterministic polynomial time) problems, for example as intrinsically more complex and/or with no efficient solution algorithm. Therefore, to ensure that a problem, in the context of embodiments of an improved frequency optimization technology, is convex with respect to x, the constraint in Equation 8, for example, must to be convex. According to the property of convex functions, convexity of $p_i$(optout-

|send m–th email) implies or leads to the convexity of the summation in Equation 10 (and the left part in Equation 8), discussed above.

In some cases, a function for an opt-out probability can be simplified as non-decreasing and/or smooth functions, for example to reduce computational complexity. In other words, to provide reduced complexity, functions can be simplified to be non-decreasing and/or smooth functions with respect to x, for example. This can be based on an observation that email recipients, such users of client devices 102a, etc., in an electronic communication campaign, are more likely to opt-out when they receive more and more email messages in a fixed period of time, for example. In embodiments, a sigmoid function for an opt-out probability can be applied, for example:

$$p(\tilde{x}) = \frac{1}{1+e^{-W^T\tilde{x}}}, \quad \text{(Equation 12)}$$

In this example, $\tilde{x} \in R^n$ can be a vector including a frequency cap x as a first component, along with other aspects. In embodiments, an input threshold F is smaller than 0.5, so it is likely the sigmoid function will be convex in the feasible or likely region of optimization problems described herein. One or more additional smooth functions can be used here, as well, in some cases.

In embodiments, an opt-out probability model (such as the exemplary opt-out probability model 222 in FIG. 2) is trained in order to achieve a non-decreasing sigmoid function for an opt-out, such as a constraint logistic regression model, for example. An exemplary equation for training a an opt-out probability model can be:

$$\min -y \log p(\tilde{x}) - (1-y)\log(1-p(\tilde{x})), \quad \text{(Equation 13)}$$

$$s.t. w_1 \geq 0,$$

In this example, the constraint can be on a weight parameter for a frequency cap or limit, for example to guarantee the opt-out probability is a non-decreasing function of the frequency cap. Embodiments disclosed herein use the resulting sigmoid function of Equation 13.

In some cases, a process or workflow for constructing an opt-out probability (as shown in FIG. 5, discussed below) can be used to determine frequency capping, to allow for higher complexity in some areas compared to others, without requiring undue resources. To allow higher complexity for some aspects or features, a more complicated machine-learning model can be applied first, generally referred to as a 1st-step model. The 1st-step model can analyze past email responses (such as opening or clicking emails, or unsubscribing), for example, and output an opt-out probability. A 2nd-step model can be applied on of, or after, the 1st-step model. In some cases, the 2nd-step model may result in a nonlinear decision boundary. In order to reach a definite result without undue resources or calculations, the 2nd-step model can include a non-decreasing smooth function for frequency capping. For example, a decision boundary for a logistic regression may have a linear value represented by $W^T\tilde{x}$. In embodiments, the 2nd-step model can provide a value or boundary that can be used to cap or limit the electronic communications frequencies provided by an optimization, such as by frequency optimizer 310.

For example, a frequency optimizer may determine to increase emails in a campaign by 50% for a first group of recipients. When this increase is applied to an individual, based on their past schedule(s), a certain electronic communications frequency will result. For example, if two emails were sent last week to the individual, the frequency optimizer may increase this to three per week, based on the 50% increase. In some cases, the process described above may determine the user is likely to opt-out at a frequency above two emails per week. Thus a cap of two emails per week can be applied to the individual, in this example.

Figure 4:
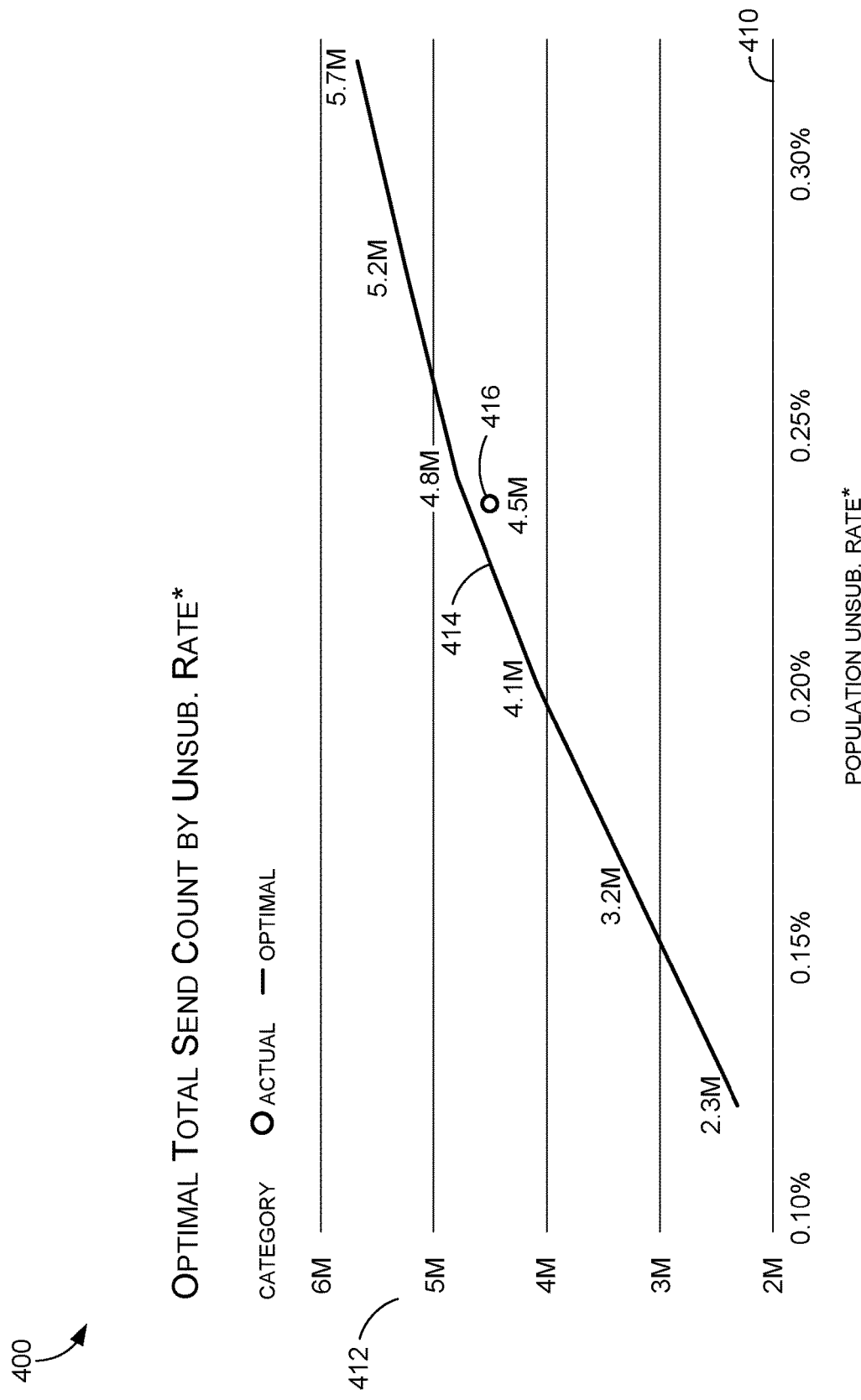
FIG. 4 depicts an exemplary graphical depiction of data associated with aspects of embodiments of the present disclosure.

Turning to FIG. 4, an exemplary graphical depiction 400 is shown, which illustrates a curve showing optimal email send counts (such as the total number of emails sent) as they relate to unsubscribe or opt-out rates for a set of users, such as campaign email recipients. For example, FIG. 4 shows that as the total number of emails sent increases, the percentage of users opting out is likely higher. The curve can be an optimal, objective curve based on model predictions using historical data for a range of opt-out rate tolerances, in accordance with aspects of embodiments of the present disclosure. This information can be used to balance aspects such as the total amount of emails sent (which increases the amount of emails opened or clicked on) against the loss of recipients due to opt-outs.

In FIG. 4, along an x-axis of the graphical depiction 400, population unsubscribe rates 410 is shown, for example by percentages of opt-outs. Along a y-axis of the graphical depiction 400, a total send count 412 is shown. FIG. 4 includes an optimal line 414, illustrating the optimal total send count 412 values that correspond to the various population unsubscribe rates 410, indicating an increase in the population unsubscribe rates 410 correlating to an increase in the total send count 412.

In this example, a population unsubscribe rate 410 of under 15% is associated with a total send count 412 of under three million, in this example in FIG. 4. In embodiments, the numerical values will differ depending on the recipients and other data. The values used in FIG. 4 are exemplary values for an embodiment, based on a certain population and certain messages sent. As shown in FIG. 4, an actual outcome 416 is indicated by the circle on the graphical depiction 400 and labeled "4.5M." This indicates the actual total send count 412 was 4.5M messages, and the actual opt-out rate, or population unsubscribe rate 410, for this actual total send count 412 of 4.5M messages is less than 25%, for example 23% or 24%. In embodiments, an optimal line 414 can be displayed in one color, such as blue, while an actual outcome 416 can be displayed in another color, such as red, for ease of viewing and distinguishing the optimal line 414 from the actual outcome 416.

Turning to FIG. 5, an exemplary diagram 500 depicts aspects of embodiments suitable for use in implementations of the present disclosure. As mentioned above, the exemplary diagram 500 in FIG. 5 illustrates a model with aspects to construct a probability of opt-outs at a point after having sent an amount of electronic communications (such as n communications). The probability can be used to limit a total opt-out rate or count for a campaign, to achieve goals relating to limiting overall opt-outs for a communications campaign to a certain amount or range. FIG. 5 illustrates aspects of a process or workflow for determining or constructing an opt-out probability, $p_i$(optout|send m–th email).

In embodiments described herein, frequency capping (represented by x), is the desired result of frequency optimization, for example as performed by a frequency optimizer 310. The overall frequency optimization can automatically be provided by a system 200, in embodiments, and the overall frequency optimization can be based on two aspects. The first aspect can be the maximization of a campaign goal or objective, such as an overall amount or rate of opened communications, or communications clicked on or selected. The second aspect can be the limitation provided by an opt-out count, described by opt-out probability functions. In other words, the two-step model that can be used for an opt-out probability (for example as shown in FIG. 5) can be used in the overall frequency optimization for a campaign.

In an example, initially, a database 510 can be accessed (which can be equivalent to data store 116 in FIG. 1), and data such as profile data 512, email delivery data 514, and tracking data 516 can be pulled, processed or analyzed, as shown at preprocessing step 518, for example. This data can be preprocessed so that one or more recipients with abnormally high volumes of delivery counts (such as above a threshold amount) are removed. Then, at 1st-step model 520, email messages delivered 30 days before a cutoff date $D_1$ are used to train the 1st-step model 520, which can cover a period during $D_0$ to $D_t$-30.

At 2nd-step model 522, email messages delivered during $D_1$-30 to $D_1$ can be used to train the 2nd-step model 522. In embodiments, input features of a 2nd-step model 522 can be scores associated with emails between $D_1$-30 to $D_1$ predicted by 1st-step model, and/or delivery count(s) for the message's recipient between $D_1$-30 to $D_1$, for example as shown by individuals' send count 524 in FIG. 5. In embodiments, the prediction labels used are the potential email responses of opt-out or not. From this, embodiments can obtain the value for the expression $p_i$(optout|send m−th email) at a time $D_1$, which is an opt-out probability, in embodiments.

Figure 6:
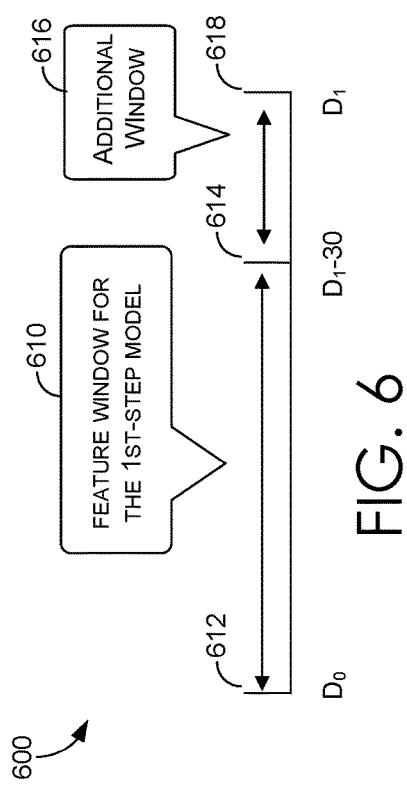
FIG. 6 depicts an exemplary diagram depicting aspects of embodiments suitable for use in implementations of the present disclosure.

FIG. 6 illustrates an exemplary diagram 600 of time periods suitable for use in implementations of the exemplary opt-out probability constructed in FIG. 5. For example, feature window 610 is a feature window 610 for a 1st-step model, extending from Do point 612 to $D_{1-30}$ point 614. A feature window 616 shown in FIG. 6 covers the time points from $D_{1-30}$ point 614 to $D_1$ point 618, which represents the feature window for the 2nd-step model. The window illustrated in FIG. 6, such as feature window 610, can correspond to the 1st-step model 520 in FIG. 5, for example.

Model Update

In some cases, an aspect of systems described herein can update and/or correct itself, for example using the most-recent recipient response data (such as behavior by users of one or more client devices 102a, 102b, 102c associated with an electronic communication campaign). Embodiments automatically update with the latest recipients' responses (for example in the last 30 days, or another time frame) in order to update and improve the system, which can then generate and/or implement new electronic communications frequency schedules, including based on the updates.

In embodiments, a delivery model can generate email delivery schedule(s) or frequencies and can be used to determine or obtain the latest recipients' response data to improve the system. An exemplary delivery model is discussed in more detail with respect to FIG. 8, below. For example, one or more importance sampling or rejection sampling methods can be used for sampling training data, including a proposed distribution in cases where the most-recent data points have a higher probability of being sampled. One example of a proposal distribution is:

Probablity of Accept this Sample=$\mu e^{-t}$

In this example, t is the time duration between a current time and an event time, while $\mu$ is a control parameter of the distribution.

Figure 7:
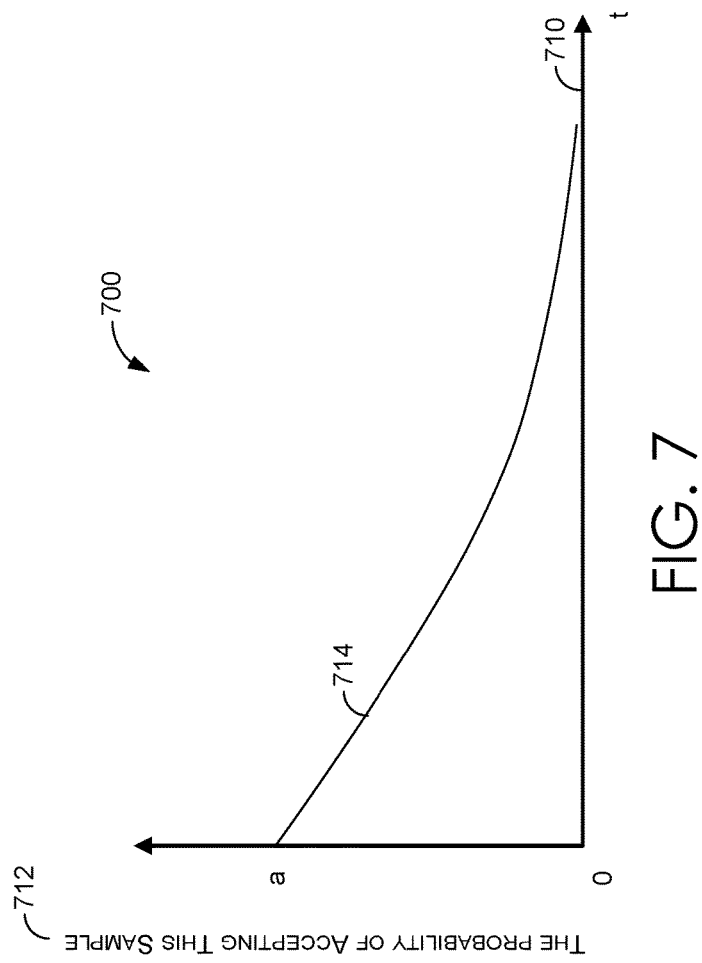
FIG. 7 depicts an exemplary graphical depiction of data associated with aspects of embodiments of the present disclosure.

In FIG. 7, an exemplary graphical depiction 700 of data associated with aspects of embodiments is shown. FIG. 7 illustrates an x-axis 710 representing t or time values from a current time until an event, for example, and a y-axis 712 representing a probability of accepting a sample. As shown in FIG. 7, line 714 indicates the probability of accepting a sample for up until an event time (during time duration t), with the probability of accepting decreasing as the time period increases from a current time to an event time along the x-axis 710.

Figure 8:
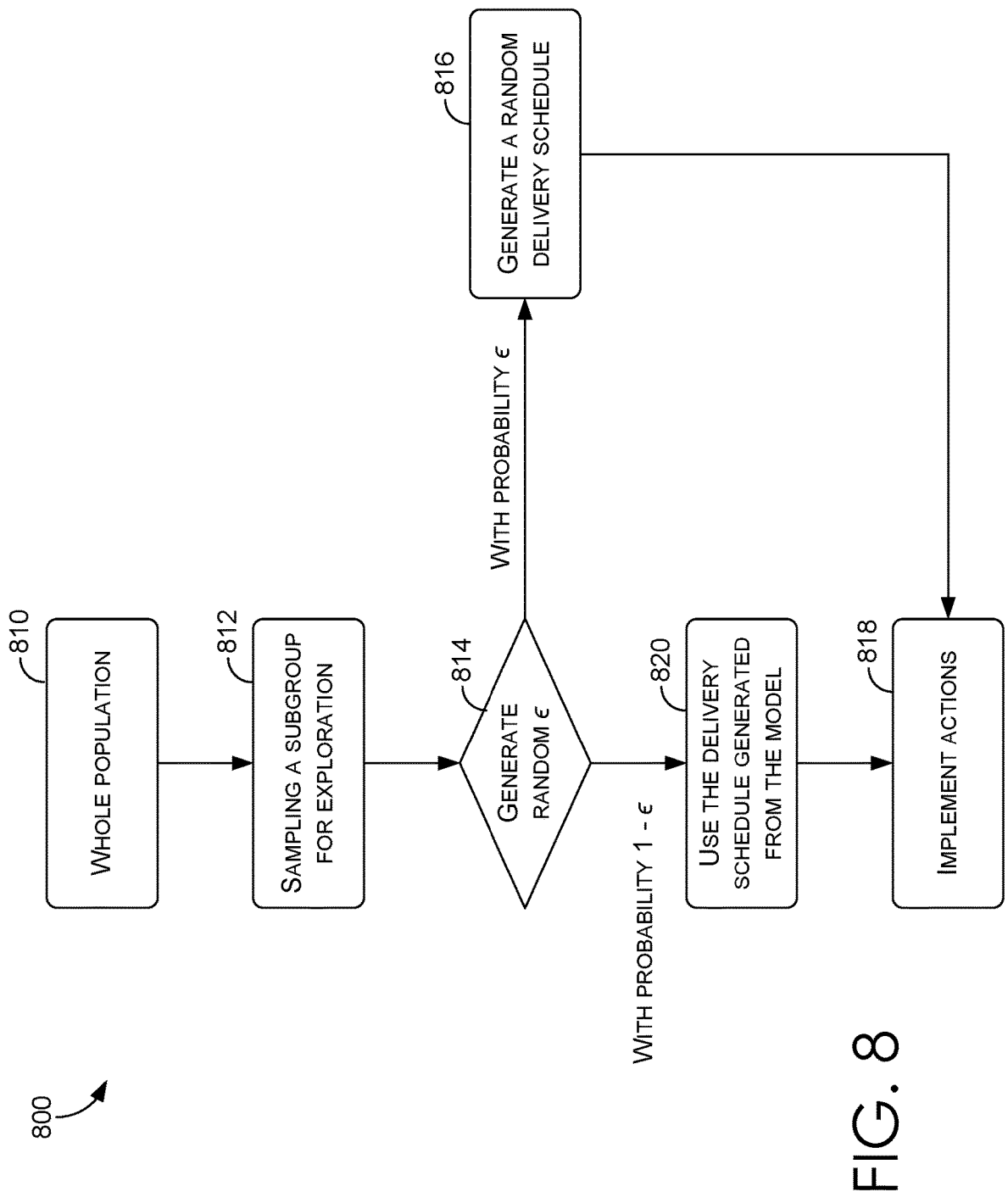
FIG. 8 depicts an exemplary flow diagram depicting illustrative aspects of processes in accordance with embodiments of the present disclosure.

An exemplary delivery model is depicted in the exemplary flow diagram 800 in FIG. 8. In one example, the flow diagram 800 represents an embodiment of a delivery model for generating a delivery schedule or frequencies, for example. As shown in FIG. 8, an entire population 810 can be considered, which can be all known email recipients or all initial participants associated with a marketing campaign, in embodiments. A subgroup sampling 812 is performed for exploration, in this example. Sampling criteria can be primarily based on a recipient's historical responses to email messages delivered to the recipient, for example via a client device 102c, in embodiments. Sampling criteria can be based on other information, in some cases, depending on the data. In general, email recipients with lower response rates will have a higher probability of being selected, because their historical information is relatively low and, in some cases, needs to be collected. In some cases, recipients' behaviors are explored due to insufficient responses in their past, to avoid expending unnecessary resources based on very little data, for example.

Continuing with FIG. 8, embodiments can generate a random probability $\epsilon$, or epsilon, as shown at 814. The results of step 814 can have a random probability of $\epsilon$, as shown in FIG. 8. The randomness at 814 can be used to determine whether or not to use a schedule for delivery of electronic communications generated using a frequency optimizer 310, A random decision process can be used to determine whether to use an optimized schedule (for example an amount of communications, sent to certain users at certain times of day) or a random schedule. If the decision at 814 is to proceed to generate a random delivery schedule, a random delivery schedule is provided at 816, in embodiments, followed by implementing actions 818. The actions can include implementing a delivery schedule including scheduling or sending one or more electronic communications. The step of generating a random c is shown at 814, and if a probability is 1−$\epsilon$, as shown, embodiments can proceed to using a delivery schedule generated from a model as shown at 820, followed by implementing an action as shown at 818.

Aspects of FIG. 8 can be implemented to increase randomness and avoid harming performance, or avoid aggressively harming performance, for example in each time step, there is only a small probability c that a random delivery schedule will be generated and/or implemented. In some cases or in most cases, a delivery schedule will be based on the delivery model, such as the models using a frequency optimizer 210, as discussed herein. Although models described herein are trained by historical data and can maximally utilize a recipient's past responses, for example to boost the recipient's engagement, the models may not be able to explore a recipient's response if there is no record in the recipient's historical data, for example. In such cases, the subgroup sampling 812 as shown in FIG. 8 can be implemented, for example right after an email delivery decision is output.

In some cases, a subgroup sampling can be based on a time period after an email delivery frequency is determined, to determine if an optimized delivery frequency is outperforming a random delivery frequency, as shown in FIG. 8. For example, a period of ten days or thirty days after an electronic communications frequency is implemented can be used. This period can be used to determine if an optimized delivery frequency has better outcomes or results than a random delivery schedule (or what would be expected with a random delivery schedule).

Content-Aware Frequency Optimization Model

The frequency optimizations described herein can be based on various inputs, as discussed above, such as campaign objectives and related probabilities (such as an email-open probability). The optimizations can be applied to customer groups to generate individual frequency schedules for sending campaign emails to one or more individuals. In some cases, the process of generating electronic communications frequencies can be further improved by automatically considering the content of emails. In such cases, embodiments can implement frequency capping that is content-aware, or at least based in part on the content of the campaign emails. For example, if emails have a subject line indicating an advertisement, recipients may be less likely to open emails or more likely to opt-out. In one example, if an email has a non-advertisement-type subject line but the body of the email is an advertisement, recipients may be more likely to unsubscribe. In some cases, the recipient may perceive a communication as misleading or unhelpful due to the content, and the recipient may have the communication open with rapid access to an unsubscribe option, such as a link to be removed from a list of recipients.

In some embodiments, a content-aware model can integrate the email-content-related information into an optimization system, such as system 200 in FIG. 2. In such cases, a system 200 can optimize an email send frequency based on user information, as described above, and the system 200 can also optimize the email send frequency based on the content of one or more emails to be sent as part of an electronic communication campaign. In an exemplary embodiment, a content-aware frequency capping model 315 is implemented with or as part of a frequency optimizer 310, shown in FIG. 3. In embodiments, the content-aware frequency capping model 315 is an extension of a group-level frequency optimization (such as group-level frequency optimization 316 in FIG. 3).

In some cases a computerized system implementing a system 200 may be able to access customers' behavior patterns including one or more effects due to the content of the email(s) themselves. The content of the email(s) has been determined to contribute to the email recipients' responses (for example the responses of a customer using client device 102a, as provided by client communications component 104 to communications-frequency manager 108).

Therefore improvements can be made to technologies for determining frequency of electronic communication campaigns, including incorporating email information and considering some or all of such information, for example an email subject, sender, type, etc. In an example, two exemplary functions that can be used to evaluate or determine the perceived relevance of emails by customers. The perceived relevance herein can indicate users' likely responsiveness to, or engagement with, one or more emails. The first illustrative function relates to an email-title-relevance score (or "TR"):

$$TR(t_m, s_m, R_K, t\_type_m) \quad \text{(Equation 14)}$$

In this function, m corresponds to the m-th email (or $m^{th}$) in a series, while $t_m$ corresponds to the email subject line of the m-th email to recipients in a group, K. The term $s_m$ corresponds to an email sender and $R_K$ corresponds to the recipients in the group, K. The term $t\_type_m$ in refers to the type of email title to the group.

The second illustrative function relates to an email-body-relevance score (or "BR"):

$$BR(b_m, R_K, b\_type_m) \quad \text{(Equation 15)}$$

In this function, $b_m$ corresponds to an email body to recipients in a group, K. The term $R_K$ corresponds to the recipients in the group, K. The term $b\_type_m$ refers to the email body type to the group.

In electronic communication campaigns, such as email marketing campaigns or other marketing campaigns with email aspects, emails to customers can be categorized as certain types of emails. For example, emails can be determined to be one of the following types: newsletters, lead nurturing, promotion, milestone, and survey email types. In some cases more or less categories can be used. Customers, including potential customers, can perceive pressure relating to the types of emails, and may be motivated to unsubscribe or opt-out from an electronic communication campaign at different levels or amounts of emails, depending on the type of emails, in some cases. For example, a user may unsubscribe at a lower frequency of emails to that user, if a higher percentage of the emails are promotion-type emails compared to newsletter-type emails.

To use email information, the email subject line ("title") and/or the email body can be determined to be of an advertising type or a non-advertising type, for instance. In one example, emails to a user may include promotional content in both the subject line and body, and thus may be determined to have an advertisement-type title and body, and these types may cause one or more customers to opt-out at a lower frequency of emails than emails with non-advertisement type titles and/or bodies. In embodiments, a communications open-rate may decline with a higher rate of communications with an advertisement-type title and/or body. In an example, Objective 1 (Obj$_1$) can be extended or used in a more general scenario as shown below:

$$\max_X \sum\nolimits_{k=1}^{n} \sum\nolimits_{m=1}^{x} \text{Open}(TR(t_m, s_m, R_K, t\_type_m)) * N_k \quad \text{(Equation 16)}$$

In the function shown at Equation 16, x indicates the desired frequency capping in the model, as discussed herein.

In embodiments, a fatigue rate can be present, for example where emails have a non-advertisement-type title but an advertisement-type bode. For example, users may be frustrated or more motivated to unsubscribe when a title causes an email to appear as a non-advertisement-type email, but the body of the email is an advertisement-type email. In this case, a constraint can be extended as shown below, to incorporate a fatigue aspect due to the content type of email subject lines and bodies:

$$\max_X \sum\nolimits_{k=1}^{n} \sum\nolimits_{m=1}^{x} \text{Fatigue} \quad \text{(Equation 17)}$$
$$(TR(t_m, s_m, R_K, t_{type_m}), BR(b_m, R_K, b\_type_m)) * N_k \leq F$$

In some embodiments, Objective 2 (Obj$_2$), which can relate to an email-total-click-count maximization, can be impacted by both the content of an email title and an email body. Thus Equation 4, described above, can be expanded as shown below to incorporate aspects of email content analysis by a model, such as system 200:

$$\max_X \sum_{k=1}^n \sum_{m=1}^x \text{Click} \\ (TR(t_m, s_m, R_K, t_{type_m}), BR(b_m, R_K, \text{b\_type}_m)) * N_k \qquad \text{(Equation 18)}$$

In some embodiments, Objective 3 ($Obj_3$), which can relate to an email-total-conversion maximization, can be impacted by an email-title type and an email-body type, for example, thus the equation can be extended as shown below:

$$\max_X \sum_{k=1}^n \sum_{m=1}^x \text{Conversion} \\ (TR(t_m, s_m, R_K, t_{type_m}), BR(b_m, R_K, \text{b\_type}_m)) * N_k \qquad \text{(Equation 19)}$$

One or more of the functions shown in Equations 14 to 19 can comprise or be implemented as machine-learning models, for example logistic regression, support vector machine (SVM), deep learning models, and/or reinforcement-learning models. In exemplary embodiments, one or more of the machine-learning models for BR and/or TR models, are trained. The training of BR and TR models can occur, for example, at the content-aware frequency capping model 315 shown in FIG. 3, after a customer-group clustering is performed, e.g., at 314 in FIG. 3. Once the machine-learning models are trained or sufficiently trained, for example after a threshold amount of training or an error rate under a threshold amount, they can be used as known functions during frequency optimization, for example by a system 200.

The content-aware frequency capping model 315 can use content data relating to electronic communications, such as emails, to optimize the campaign goals such as a total count of opened electronic communications (e.g., $Obj_1$). In some cases, where electronic messages through an application or text are used, content data can also be used by content-aware frequency capping model 315. For example, the textual description of a hyperlink in an electronic communication could correspond to an email subject line, and the content at the hyperlink's destination can correspond to the body of an email. In other words, if a link does not indicate an advertisement, but selecting the link leads a user to an advertisement, the user's likelihood of opting out may be higher, even at lower levels of messages sent.

In some cases, content-aware frequency capping model 315 can be used in place of, or as, the group-level frequency optimization 316. In other cases, content-aware frequency capping model 315 can supplement or improve the group-level frequency optimization 316. In some embodiments, content data relating to electronic messages may not be available, for example if electronic messages have not been provided or composed yet. In this case, use of the content-aware frequency capping model 315 may not be an option, but the group-level frequency optimization 316 can still be used.

Simulation Results

Figure 9:
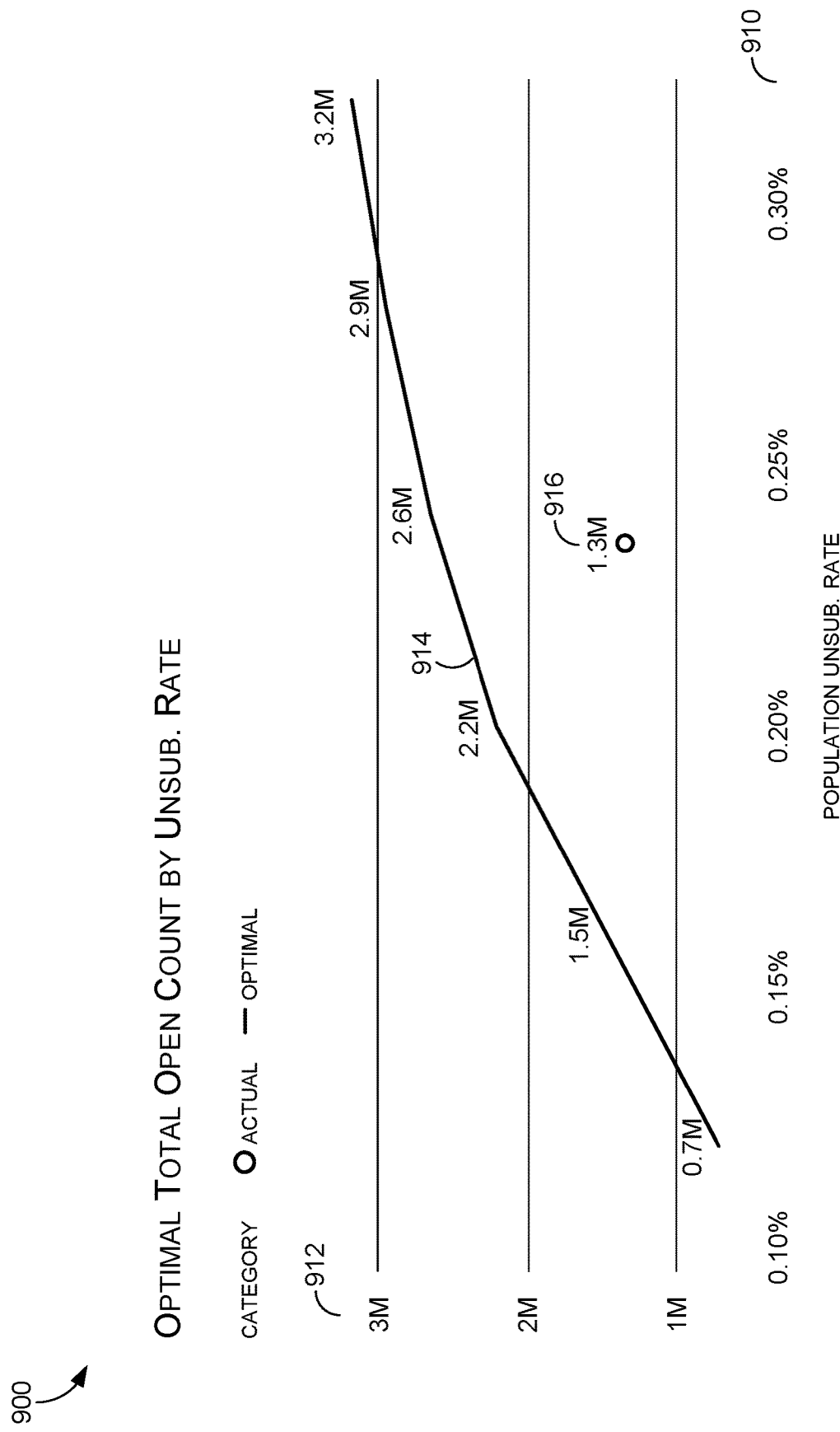
FIG. 9 depicts an exemplary graphical depiction of data associated with aspects of embodiments of the present disclosure.

Based on a simulation, an optimized total open count and an optimized total open rate was determined. For example, an optimal curve of open count maximization can be determined (as discussed with respect to FIG. 9) and an optimal curve of open rate maximization (as discussed with respect to FIG. 10), both under the constraint of an opt-out rate, for example. Turning to FIG. 9, an exemplary graphical depiction 900 of an optimal curve of open count maximization is shown. For example, a population unsubscribe or opt-out rate is shown along an x-axis 910, while a total open count is shown along a y-axis, with a curve 914 indicating an optimal curve of open count maximization. As shown at actual value 916, a total open count of 1.3M was found, at a population unsubscribe rate below 25%, for example. Other values may be determined or used, based on a desired opt-out rate, for example, or based on other data, such as individual recipients' historical or recent responses, or the types or timing of email messages. In this example, an optimized total open count is 2.5M, much higher than the actual value of 1.3M, at the opt-out (or un-subscription) rate of 24%. By implementing embodiments of a frequency optimizer, such as frequency optimizer 310 described herein, the total open count for an electronic communications campaign is almost doubled, in this example.

Figure 10:
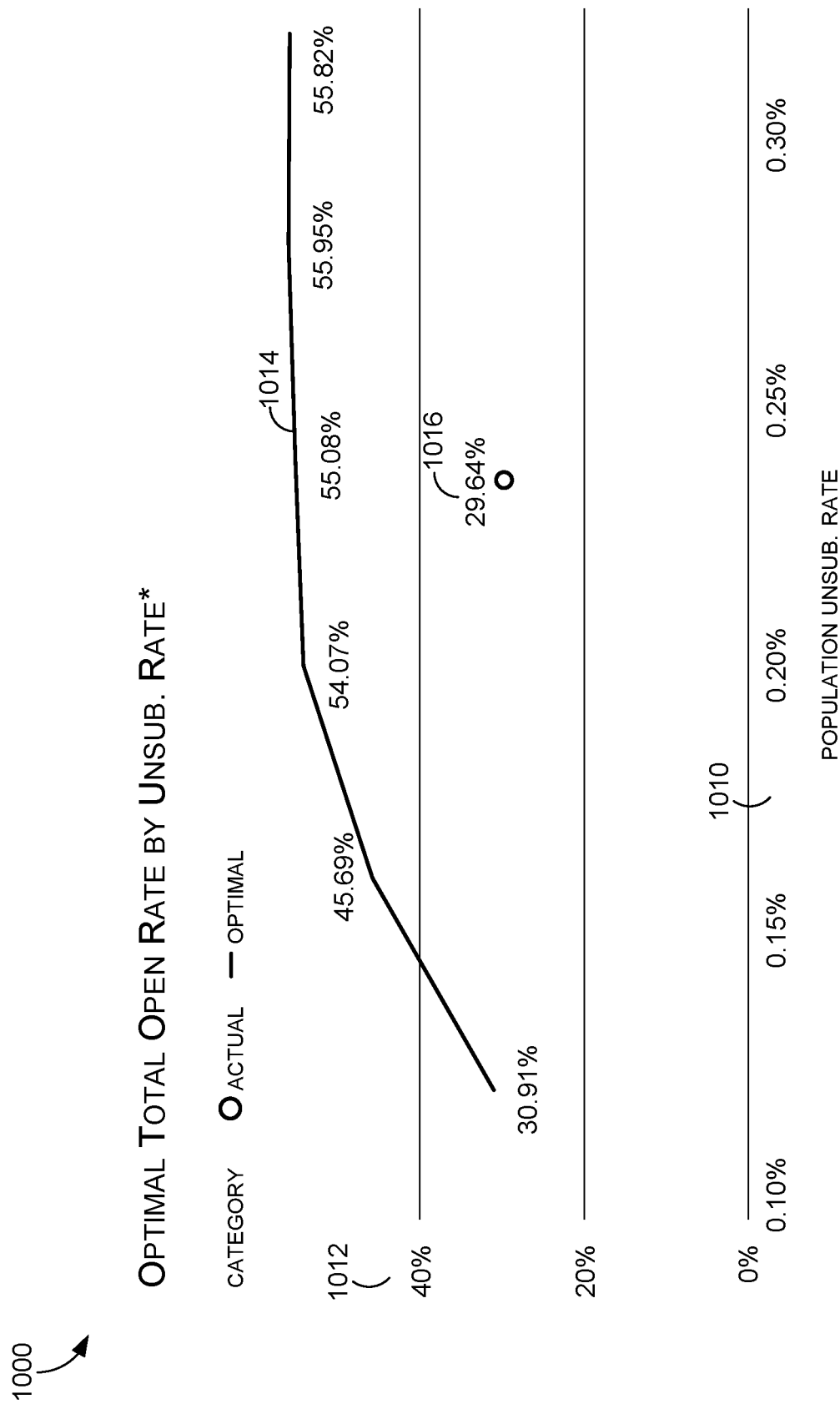
FIG. 10 depicts an exemplary graphical depiction of data associated with aspects of embodiments of the present disclosure.

Turning to FIG. 10, an exemplary graph 1000 of an optimal curve of open rate maximization is shown. For example, in FIG. 10, a population unsubscribe rate is along the x-axis 1010, while the total open rate is shown along the y-axis 1012. Curve 1014 reflects an optimal curve of open rate maximization, in an example. Additionally, an actual value 1016 of 29.64% total open rate is shown, with a population unsubscribe or opt-out rate below 25%, for example. In other words, as shown in FIG. 10, embodiments using a frequency optimizer 310, can provide an optimized open rate is around 55.08%, compared to the current or actual open rate of 29.64%, with an overall, population opt-out rate of 24%, demonstrating the improved frequency optimization technologies disclosed in embodiments of this disclosure. The simulation results illustrate, for example, the improved electronic communication campaign technologies provided in the present disclosure, with improves results with respect to campaign goal(s), within a target opt-out range.

Figure 11:
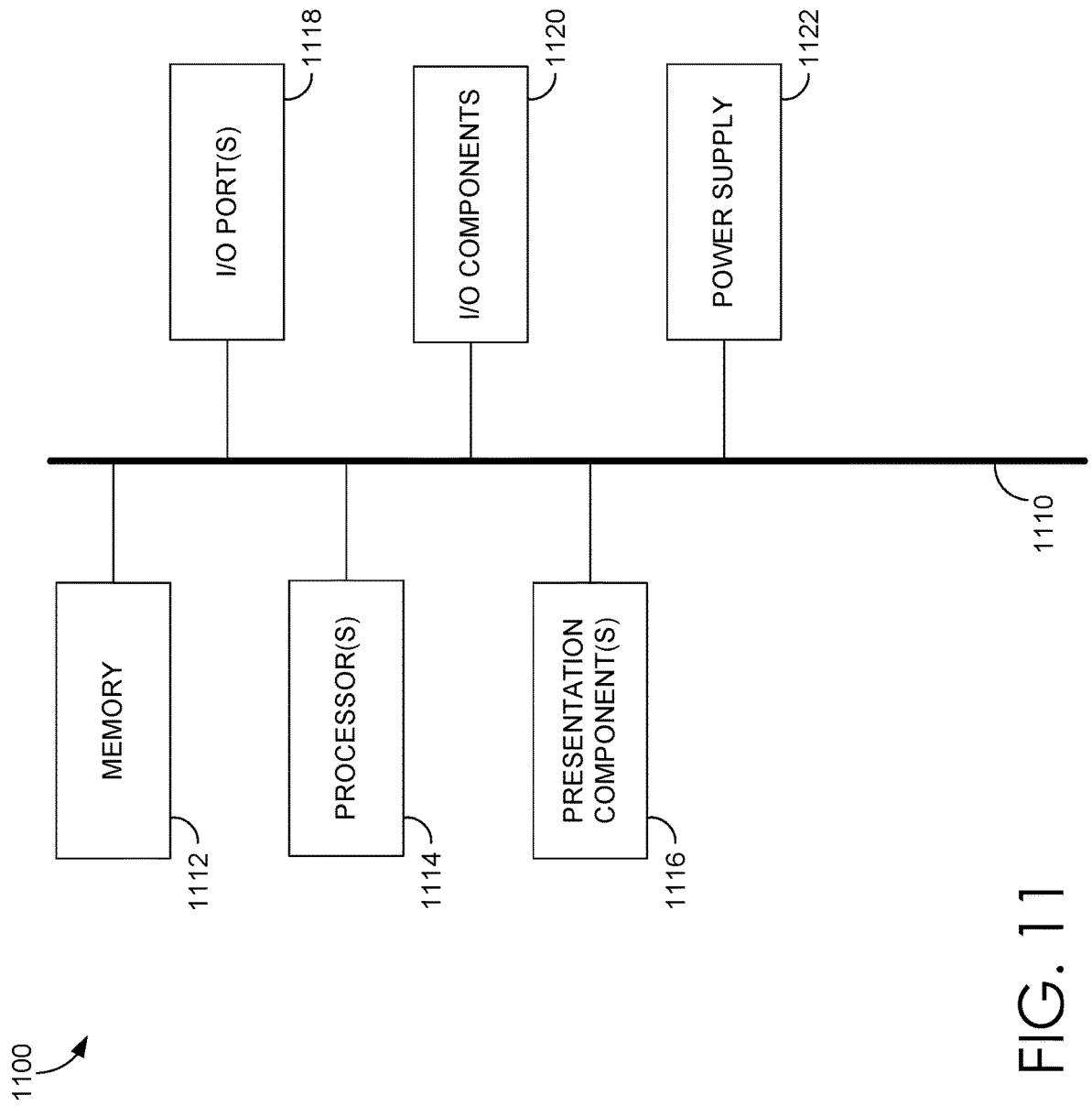
FIG. 11 is a block diagram of an example computing environment suitable for use in implementing embodiments of the technology described herein.

Having described an overview of embodiments of the present invention, an exemplary operating environment in which embodiments of the present invention may be implemented is described below in order to provide a general context for various embodiments of the present invention. Referring initially to FIG. 11 in particular, an exemplary operating environment for implementing embodiments of the present invention is shown and designated generally as computing device 1100. Computing device 1100 is but one example of a suitable computing environment and is not intended to suggest any limitation as to the scope of use or functionality of the invention. Neither should computing device 1100 be interpreted as having any dependency or requirement relating to any one or combination of components illustrated The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

In FIG. 11, computing device 1100 can include bus 1110 that directly or indirectly couples the following devices: memory 1112, one or more processors 1114, one or more presentation components 1116, input/output ports 1118, input/output components 1120, and illustrative power supply 1122. Bus 1110 represents what may be one or more buses (such as an address bus, data bus, or combination thereof). The various blocks of FIG. 11 are shown with lines for the sake of conceptual clarity, and other arrangements of the described components and/or component functionality are contemplated. For example, one may consider a presentation component such as a display device to be an I/O component. In addition, processors have memory. We recognize that such is the nature of the art, and reiterate that the diagram of FIG. 11 is merely illustrative of an example computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 110. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 816 present data indications to a user or other device. Exemplary presentation components include a display device, speaker, printing component, vibrating component, etc. I/O ports 1118 allow computing device 1100 to be logically coupled to other devices including I/O components 1120, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. Low-level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

The subject matter of embodiments is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although a "step" and/or "block" may be used herein to connote different elements of methods employed, the terms should not be interpreted as implying any particular order among or between various steps herein disclosed unless and except when the order of individual steps is explicitly described.

Many different arrangements of the various components depicted, as well as components not shown, are possible without departing from the scope of the claims below. Embodiments of the disclosed technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for scheduling electronic communications to be sent to a first individual, the method comprising:
    obtaining a first electronic communication campaign goal, for an electronic communication campaign, to maximize an amount of electronic communications opened by electronic communication recipients, the first electronic communication campaign goal received by a system comprising an electronic communication campaign interface and a content module accessed over a network, wherein the content module comprises one or more datasets;

obtaining an opt-out rate tolerance for the electronic communication campaign;

for a plurality of electronic communication recipients, determining a group frequency optimization based on the first electronic communication campaign goal and the opt-out rate tolerance for the electronic communication campaign, the group frequency optimization indicating a frequency, determined convexly, at which to communicate electronic communications to the plurality of electronic communication recipients, wherein the group frequency optimization includes a constraint based on responses to a first set of emails, wherein the constraint incorporates a first relevance score associated with a plurality of subject lines in the first set of emails and a second relevance score associated with a plurality of email bodies in the first set of emails;

determining an individual electronic communication frequency for an individual of the plurality of electronic communication recipients, the individual electronic communication frequency determined by applying the group frequency optimization to a prior electronic communication frequency associated with the individual;

receiving a customization of a value associated with the first electronic campaign goal, wherein the customization is input at a remote client device via the electronic communication campaign interface;

automatically determining an updated group frequency optimization, based at least in part on the value associated with the first electronic campaign goal;

automatically updating the individual electronic communication frequency based on the updated group frequency optimization; and initiating communication, via the network, of an electronic communication in accordance with the updated individual electronic communication frequency.

2. The method of claim 1, wherein the first electronic communication campaign goal is a total electronic communication open count maximization.

3. The method of claim 1, wherein the first electronic communication campaign goal is a total electronic communication click count maximization.

4. The method of claim 1, wherein the first electronic communication campaign goal is a total conversion maximization.

5. The method of claim 1, wherein determining a group frequency optimization includes considering input from a plurality of probability models.

6. The method of claim 5, wherein the plurality of probability models includes an electronic communication open probability model.

7. The method of claim 6, wherein the plurality of probability models further includes an opt-out probability model.

8. The method of claim 1, wherein at least one of the plurality of subject lines in the first set of emails relates to a purchase and at least one of the plurality of email bodies in the first set of emails does not relate to the purchase.

9. The method of claim 1, wherein the first relevance score and the second relevance score indicate a consistency between the plurality of subject lines in the first set of emails and the plurality of email bodies in the first set of emails.

10. The method of claim 5, wherein at least one of the plurality of probability models comprises a machine learning model.

11. A method for scheduling electronic communications to be sent to a recipient, the method comprising:

obtaining a first electronic communication campaign goal, the first electronic communication campaign goal received by a system comprising a content module accessed over the network, wherein the content module comprises a first dataset;

obtaining an opt-out rate for the electronic communication campaign;

for a plurality of electronic communication recipients, determining, at least in part based on a convex calculation to reduce computational resource utilization, a group frequency optimization and a frequency capping, the frequency capping based on responses to a first set of emails that contain hyperlink descriptions, and wherein the frequency capping is for a certain amount of time;

determining an individual electronic communication frequency for an individual of the plurality of electronic communication recipients, the individual electronic communication frequency determined by applying the group frequency optimization to a prior electronic communication frequency associated with the individual;

receiving a customization of a value associated with the first electronic campaign goal, wherein the customization is input at a remote client device via the electronic communication campaign interface;

automatically determining an updated group frequency optimization, based at least in part on the value associated with the first electronic campaign goal;

automatically updating the individual electronic communication frequency based on the updated group frequency optimization; and initiating communication, via the network, of an electronic communication in accordance with the updated individual electronic communication frequency.

12. A method for scheduling electronic communications to be sent to a first individual, the method comprising:

obtaining a first electronic communication campaign goal, for an electronic communication campaign, to maximize an amount of electronic communications opened by electronic communication recipients, the first electronic communication campaign goal received by a system comprising an electronic communication campaign interface and a content module accessed over a network, wherein the content module comprises one or more datasets;

obtaining an opt-out rate tolerance for the electronic communication campaign;

for a plurality of electronic communication recipients, determining a group frequency optimization based on the first electronic communication campaign goal and the opt-out rate tolerance for the electronic communication campaign, the group frequency optimization determined at least in part based on a convex optimization comprising minimizing a plurality of convex functions, and indicating a frequency at which to communicate electronic communications to the plurality of electronic communication recipients, wherein the group frequency optimization includes a cap that is applied based on responses to a set of sent emails and a comparison of one or more subject lines of the set of sent emails to one or more email bodies of the set of sent emails;

determining an individual electronic communication frequency for an individual of the plurality of electronic communication recipients, the individual electronic communication frequency determined by applying the group frequency optimization to a prior electronic communication frequency associated with the individual;

receiving a customization of a value associated with the first electronic campaign goal, wherein the customization is input at a remote client device via the electronic communication campaign interface;

automatically determining an updated group frequency optimization, based at least in part on the value associated with the first electronic campaign goal;

automatically updating the individual electronic communication frequency based on the updated group frequency optimization; and initiating communication, via the network, of an electronic communication in accordance with the updated individual electronic communication frequency.

13. The method of claim 1, wherein the first relevance score and the second relevance score are determined from machine learning models trained on the first set of emails.

* * * * *